US012086965B2

(12) United States Patent
Zhao et al.

(10) Patent No.: US 12,086,965 B2
(45) Date of Patent: Sep. 10, 2024

(54) IMAGE REPROJECTION AND MULTI-IMAGE INPAINTING BASED ON GEOMETRIC DEPTH PARAMETERS

(71) Applicant: Adobe Inc., San Jose, CA (US)

(72) Inventors: Yunhan Zhao, Irvine, CA (US);
Connelly Barnes, Seattle, WA (US);
Yuqian Zhou, Urbana, IL (US);
Sohrab Amirghodsi, Seattle, WA (US);
Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 244 days.

(21) Appl. No.: 17/520,361

(22) Filed: Nov. 5, 2021

(65) Prior Publication Data

US 2023/0145498 A1  May 11, 2023

(51) Int. Cl.
*G06T 5/77* (2024.01)
*G06T 3/18* (2024.01)
(Continued)

(52) U.S. Cl.
CPC ............. *G06T 5/77* (2024.01); *G06T 3/18* (2024.01); *G06T 3/4046* (2013.01); *G06T 5/50* (2013.01); *G06T 7/30* (2017.01); *G06T 7/50* (2017.01); *G06T 7/90* (2017.01); *G06T 2207/20084* (2013.01); *G06T 2207/20221* (2013.01)

(58) Field of Classification Search
CPC ..... G06T 5/005; G06T 3/0093; G06T 3/4046; G06T 5/50; G06T 7/30; G06T 7/50; G06T 7/90; G06T 2207/20084; G06T 2207/20221; G06T 2207/10028
See application file for complete search history.

(56) References Cited

U.S. PATENT DOCUMENTS

2019/0122378 A1*  4/2019  Aswin ................. G06T 7/20
2020/0211206 A1*  7/2020  Wang ................... G06N 3/08
(Continued)

OTHER PUBLICATIONS

Zeng, et al. High-resolution image inpainting with iterative confidence feedback and guided upsampling. In ECCV 2020.
(Continued)

*Primary Examiner* — Oneal R Mistry
*Assistant Examiner* — Vaisali Rao Koppolu
(74) *Attorney, Agent, or Firm* — Keller Preece PLLC

(57) ABSTRACT

The present disclosure relates to systems, methods, and non-transitory computer-readable media for accurately restoring missing pixels within a hole region of a target image utilizing multi-image inpainting techniques based on incorporating geometric depth information. For example, in various implementations, the disclosed systems utilize a depth prediction of a source image as well as camera relative pose parameters. Additionally, in some implementations, the disclosed systems jointly optimize the depth rescaling and camera pose parameters before generating the reprojected image to further increase the accuracy of the reprojected image. Further, in various implementations, the disclosed systems utilize the reprojected image in connection with a content-aware fill model to generate a refined composite image that includes the target image having a hole, where the hole is filled in based on the reprojected image of the source image.

20 Claims, 14 Drawing Sheets

(51) Int. Cl.
  *G06T 3/4046* (2024.01)
  *G06T 5/50* (2006.01)
  *G06T 7/30* (2017.01)
  *G06T 7/50* (2017.01)
  *G06T 7/90* (2017.01)

(56) References Cited

U.S. PATENT DOCUMENTS

2021/0004976 A1* 1/2021 Guizilini .................. G06T 7/521
2021/0056668 A1* 2/2021 Barnes ...................... G06T 5/77
2021/0279904 A1* 9/2021 Sinha ....................... G06T 9/002

OTHER PUBLICATIONS

Yuqian Zhou et al. "TransFill: Reference-guided Image Inpainting by Merging Multiple Color and Spatial Transformations". In: Proceedings of the IEEE/CVF Conference on Computer Vision and Pattern Recognition. 2021, pp. 2266-2276.

Zhang et al. Learning two-view correspondences and geometry using order-aware network. In CVPR 2019.

DeTone et al. Superpoint: Self-supervised interest point detection and description. In CVPRW 2018.

Sarlin et al. Superglue: Learning feature matching with graph neural networks. In CVPR 2020.

Ranftl et al. Towards robust monocular depth estimation: Mixing datasets for zero-shot cross-dataset transfer. In TPAMI 2020.

Yin et al. Learning to recover 3d scene shape from a single image. In CVPR 2021.

Jonathan T Barron. "A general and adaptive robust loss function". In: Proceedings of the IEEE/CVF Conference on Computer Vision and Pattern Recognition. 2019, pp. 4331-4339.

Darabi et al. Image Melding: Combining Inconsistent Images using Patch-based Synthesis. In SIGGRAPH 2012.

Alex M Andrew. "Multiple view geometry in computer vision". In: Kybernetes (2001).

Rene Ranftl et al. "Towards robust monocular depth estimation: Mixing datasets for zero-shot cross-dataset transfer". In: arXiv preprint arXiv:1907.01341 (2019).

Tinghui Zhou et al. "Stereo magnification: Learning view synthesis using multiplane images". In: arXiv preprint arXiv: 1805.09817 (2018).

* cited by examiner

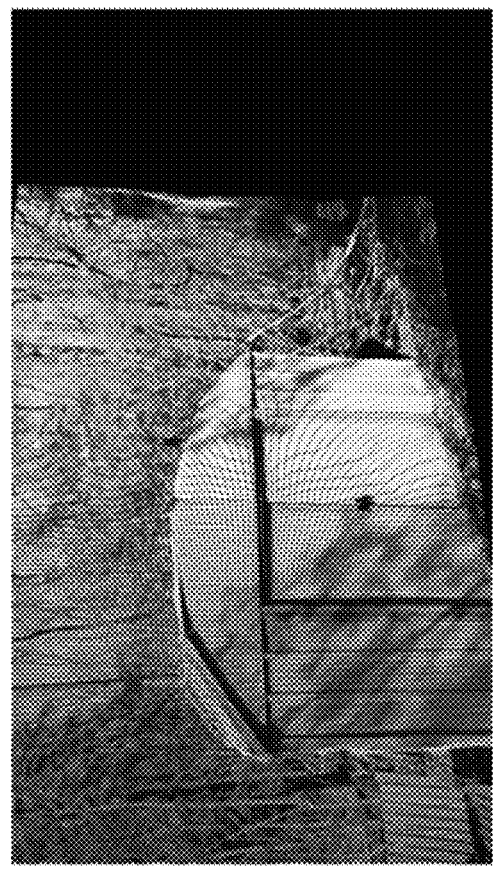
Fig. 9B

IMAGE REPROJECTION AND MULTI-IMAGE INPAINTING BASED ON GEOMETRIC DEPTH PARAMETERS

BACKGROUND

Recent years have seen a proliferation in the use of computing devices in the area of digital image editing. For instance, improvements continue to be made in the areas of object detection, inclusion, and exclusion to generate naturally appearing modified digital images. Notwithstanding these improvements, current systems continue to suffer from several problems with regard to the accuracy of computing device operations, and in particular, with respect to filling blank regions with estimated content in images where objects have been removed. To illustrate, suppose a digital image includes an undesired object such as a sign or a moving car that blocks a captured scene. To remove this undesired object, conventional image editing systems fill the void or hole of the removed object by guessing the content that was behind the object. However, because of the difficulty of not knowing what is behind the undesired object in a digital image, conventional content-filling systems often inaccurately fill the void. As a result, the filled digital image appears unnatural and unesthetic. These along with additional problems and issues exist in current systems that generate digital images based on image content filling.

SUMMARY

Implementations of the present disclosure provide benefits and/or solve one or more of the foregoing or other problems in the art with systems, non-transitory computer-readable media, and methods that accurately, flexibly, and efficiently generate a reprojected image from a pair of digital images (e.g., a source image and a target image) of a scene utilizing depth predictions. More specifically, in various implementations, the disclosed systems determine a depth prediction for a source image as well as camera pose information between the source image and a target image. The disclosed systems then generate a reprojected source image that warps the source image by the depth prediction to align with the target image.

Additionally, in some implementations, the disclosed systems utilize a depth prediction optimization pipeline that includes multiple optimization functions to further refine warping parameters before generating the reprojected digital image. Further, in various implementations, the disclosed systems generate a refined composite image from the reprojected source image utilizing a content-aware fill model, where the refined composite image includes the target image with a hole filled in based on the reprojected source image.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIGS. 9A-9B illustrate a block diagram of generating a refined composite image from the reprojected image and a content-aware fill model in accordance with one or more implementations.

DETAILED DESCRIPTION

Figure 1:
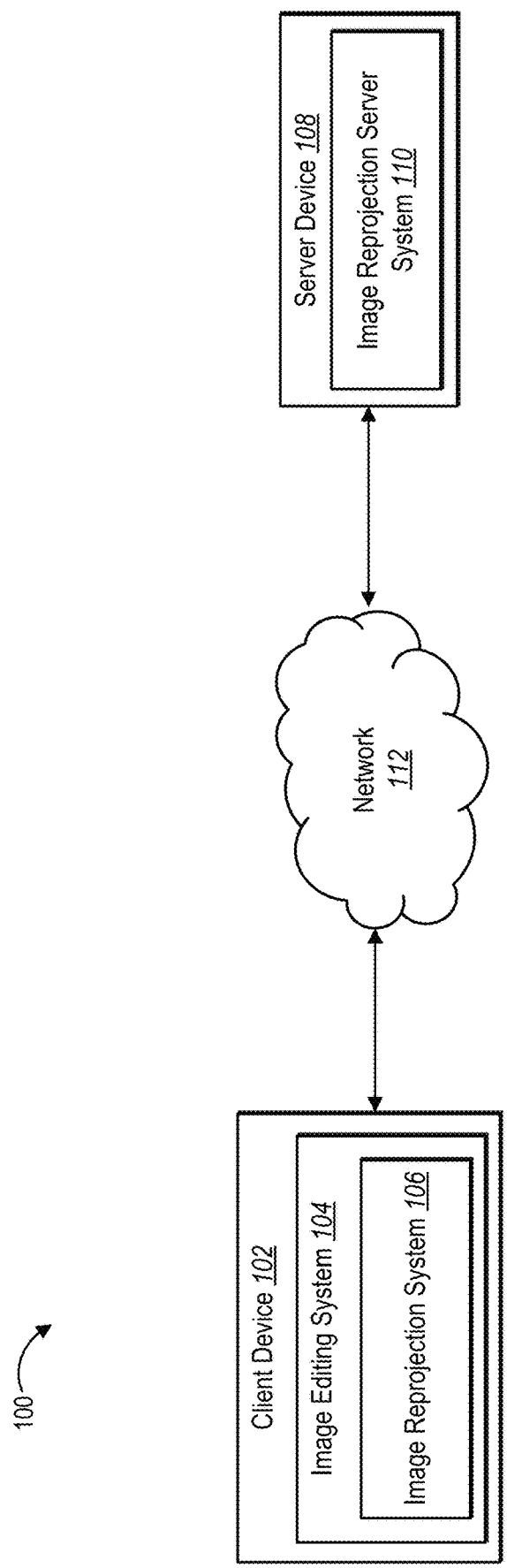
FIG. 1 illustrates a system environment in which an image reprojection system operates in accordance with one or more implementations.

This disclosure describes one or more implementations of an image reprojection system that accurately restores missing pixels within a hole region of a target image utilizing multi-image inpainting techniques based on incorporating geometric depth information. For example, in various implementations, the image reprojection system utilizes a depth prediction of a source image as well as camera relative pose parameters to generate a rescaled depth prediction. As a result, the image reprojection system is able to generate a more accurate reprojected image of the source image. Additionally, in some implementations, the image reprojection system jointly optimizes the depth rescaling and camera pose parameters before generating the reprojected source image, which results in further increases image accuracy. Moreover, in various implementations, the image reprojection system utilizes the reprojected source image with a content-aware fill model to generate a refined composite image, where the refined composite image includes the target image having a hole and the hole is filled in based on a portion of the reprojected source image.

To illustrate, in various implementations, the image reprojection system generates a depth prediction for a source image of an object or a scene. In addition, the image reprojection system determines a relative camera pose (e.g., a relative camera matrix) of the object or scene based on a set of matching correspondence points between the source image and the target image. Further, in some implementations, the image reprojection system generates a reprojected image of the source image that includes at least a portion of the source image warped to align with the target image. Moreover, in some implementations, the image reprojection system generates a refined composite image from the reprojected source image utilizing a content-aware fill model where the refined composite image includes the target image having a hole that is filled in based on the reprojected source image.

As mentioned above, in one or more implementations, the image reprojection system generates a depth prediction for a source image of an object or scene. In one or more implementations the image reprojection system generates the depth prediction utilizing a passive method such as depth from stereo images, estimates the depth prediction from dense correspondences, or utilizes an active method such as Lidar or structured light patterns. In one or more implementations, the image reprojection system generates the depth prediction utilizing a depth prediction neural network. For example, the depth prediction neural network generates a monocular depth prediction for the source image. In some implementations, the image reprojection system generates the depth prediction as a monocular depth prediction utilizing a monocular depth estimation neural network or a depth prediction neural network having a point cloud model.

As also mentioned above, in one or more implementations, the image reprojection system generates a relative camera matrix (i.e., a relative camera pose) between the source image and the target image. For example, the image reprojection system determines matching correspondence points between the source image and the target image. In some implementations, the image reprojection system utilizes a scale invariant feature transform (SIFT) and/or an order-aware neural network (OANet) to determine the matching correspondence points. In addition, in various implementations, the image reprojection system utilizes a multi-point algorithm to determine the relative camera matrix from the matching correspondence points.

In various implementations, the image reprojection system determines a scale factor and an offset variable (e.g., scale and offset) that aligns the depth prediction to the same scale as the relative pose (i.e., translation scale), when these parameters are unknown (such as is the case with monocular depth predictions). For example, the image reprojection system generates a three-dimensional structure of the matching correspondence points based on a triangulation of both the relative camera matrix and the matching correspondence points. In addition, the image reprojection system generates and utilizes a sparse depth map based on the three-dimensional structure. Then, the image reprojection system determines the scale and the offset by solving a linear regression function on the sparse depth map.

In various implementations when the depth prediction has an unknown scale factor, the image reprojection system determines a rescaled depth prediction based on the depth prediction and the relative camera matrix. For instance, in various implementations, the image reprojection system applies the determined scale and an offset to the depth prediction to align with the relative camera matrix and generate the rescaled depth prediction. Further, utilizing the rescaled depth prediction, the image reprojection system is able to generate a reprojected image of the source image (i.e., reprojected source image) that accurately aligns with the target image.

As also mentioned above, in various implementations, the image reprojection system refines various parameters before generating the reprojected source image. For example, the image reprojection system refines the scale factor and the offset variable utilizing an optimization pipeline that includes multiple optimization functions. Further, in various implementations, the image reprojection system also jointly refines parameters of the relative camera matrix, which include a rotation and a translation, utilizing the optimization pipeline.

To illustrate, in one or more implementations, the image reprojection system refines the warping parameters mentioned above (e.g., depth rescaling factors such as scale and offset as well as relative camera pose factors such as rotation and translation) utilizing a least squares function, a negative depth penalty function, a multi-scale photometric function, and/or a feature correspondence function. For example, in example implementations, the least squares function improves the initial scale and the initial offset of the rescaled depth prediction based on the three-dimensional structure of the plurality of matching correspondence points, the negative depth penalty function penalizes negative depth points positioned behind the plurality of source camera coordinates after rescaling, the multi-scale photometric function measures color differences between a warped area in the reprojected image and a corresponding adjacent area of the target image, and the feature correspondence function measures distances between reprojected matching feature points in the source image and the target image.

Upon refining the warping parameters of the depth prediction and the relative camera matrix, the image reprojection system is able to generate the reprojected image utilizing the refined warping parameters. In this manner, the image reprojection system generates a highly accurate reprojected source image that accurately aligns with the target image.

As mentioned above, in various implementations, the image reprojection system generates a refined composite image from the reprojected image utilizing a content-aware fill model. For example, the image reprojection system provides the target image with a hole (e.g., an image hole mask) and the reprojected image to a color-spatial transformation model that generates a refined composite image by blending and smoothing out the reprojected area in the hole of the target image.

As also mentioned above, conventional image editing systems suffer from several problems with regard to the accuracy of computing device operations. For example, many conventional systems inaccurately fill holes in images where a portion of the image has been removed (called inpainting). Indeed, removing undesired objects from photos is an inherently challenging problem because it is often not possible to accurately determine what was behind the removed object, and thus a perfect or accurate fill is difficult to achieve.

To illustrate, some conventional systems inpaint a hole within an image utilizing only the image as the reference input. However, as a hole region enlarges in size, details from scene geometry are lost and these conventional systems become increasingly inaccurate when filling the hole. Indeed, for large hole regions or other challenging cases (e.g., when the input image is different from training data), these conventional systems generate images that are unrealistic and unnatural.

To overcome these issues, some conventional systems employ multi-image inpainting. For instance, these conventional systems leverage the knowledge from additional images taken from other viewpoints of the same scene. For example, a few of these conventional systems rely on homographies to perform inpainting. While these conventional systems achieve better results than a single-image inpainting system, they still face challenges in terms of image accuracy. For example, with these conventional systems, the more a camera moves between images, the more inaccurate the estimated homographies become. This is particularly true for scenes with complex (e.g., non-planar) geometry or large hole regions as these conventional systems often introduce misalignment artifacts, which results in inaccurate inpainting.

In contrast, the image reprojection system provides numerous advantages and benefits over conventional systems. As described below, in many implementations, the image reprojection system improves accuracy relative to conventional systems. To illustrate, the image reprojection system utilizes geometric depth information to model a scene rather than planarity assumptions from homographies. More specifically, the image reprojection system utilizes reprojections of estimated depth maps and relative camera poses to perform multi-image inpainting. For example, as noted above, in various implementations, the image reprojection system utilizes depth information in the form of depth predictions, rescaled depth predictions, and rescaled depth predictions with refined warping parameters to generate accurate reprojected source images that align with target images, initial composite images, and/or refined composite images.

In some implementations, the image reprojection system utilizes a monocular depth prediction (e.g., that is estimated with increasingly accurate monocular depth estimation networks) and relative camera poses (e.g., that is estimated with classical multi-view geometry). By incorporating these warping parameters in a novel way, the image reprojection system is able to more accurately determine depth parameters, such as scale and offset, that result in an improved rescaled depth prediction. Additionally, in various implementations, the image reprojection system refines these and other parameters utilizing an optimization pipeline to further improve the accuracy of a reprojected image, an initial composite image, and/or a refined composite image.

Indeed, compared to conventional systems, the image reprojection system is able to achieve significant improvements in terms of accuracy compared to image warping with a single homography by state-of-the-art conventional systems. For example, the image reprojection system realistically preserves details from scene geometries, even when the hole region of an image is large or the scene is complex. Further to this point, FIG. 10 below shows qualitative results comparing reprojected images between an example implementation of the image reprojection system with a state-of-the-art system.

Additional detail regarding the image reprojection system is now provided with reference to the figures. For example, FIG. 1 illustrates a schematic diagram of an environment 100 for implementing an image reprojection system 106 (i.e., a multi-image depth-based reprojection system) in accordance with one or more implementations. An overview of the image reprojection system 106 is described in relation to FIG. 1. Thereafter, a more detailed description of the components and processes of the image reprojection system 106 is provided in relation to the subsequent figures.

As shown, the environment 100 (i.e., a digital medium system environment) includes the client device 102, which includes an image editing system 104 and an image reprojection system 106. In various implementations, the client device 102 is associated with a user (e.g., a user client device). For example, the client device 102 detects input from a user requesting that the image reprojection system 106 generate a reprojected image, an initial composite image, and/or a refined composite image from a source image and a target image.

As mentioned, the environment includes a client device 102. The client device 102 is one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single instance of the client device 102, in some implementations, the environment includes multiple different client devices, each associated with a different user (e.g., a digital content editor). The client device 102 communicates with the server device 108 via the network 112, as noted above.

In various implementations, the image editing system 104 implements some or all of the image reprojection system 106. In alternative implementations, the image reprojection system 106 is separate from the image editing system 104. While the image editing system 104 and the image reprojection system 106 are shown on the client device 102, in some implementations, the image editing system 104 and/or the image reprojection system 106 are located remotely (fully or in part) from the client device 102 (e.g., on the server device 108), as further explained below.

The image editing system 104, in general, facilitates the creation, modification, sharing, searching, and/or deletion of digital images. For instance, the image editing system 104 provides a variety of tools related to image creation and editing (e.g., photo editing). For example, the image editing system 104 provides selection tools and image manipulation tools. Moreover, the image editing system 104 optionally operates in connection with one or more applications to generate or modify digital images including removing objects from digital images. In some instances, the image editing system 104 operates in connection with digital design applications or other image editing applications. For example, the image editing system 104 is able to crop an object portrayed in a digital image and move the object to another digital image (e.g., with a new background).

For context, a digital image refers to a digital visual representation (e.g., a digital graphics file that when rendered displays one or more objects or scenes). In various implementations, images are made up of pixels of features that group together to form a visual representation. In various implementations, an image editing system displays an image on a computing device, such as a client device. Digital images, in one or more embodiments, include a source and a target image pair. In various implementations, a source image and a target image capture the same object or scenes from different viewpoints. A source image and a target image may be captured by the same camera or a different camera. In some implementations, a source image and a target image are captured in a virtual environment.

As mentioned above, the image editing system 104 includes the image reprojection system 106. As further provided below, the image reprojection system 106 generates a reprojected image of a source image that accurately aligns with a target image. In various implementations, the image reprojection system 106 utilizes a depth prediction and a relative camera pose (e.g., a relative camera matrix) to generate the reprojected image. Additional detail regarding the image reprojection system 106 is provided in the subsequent figures.

In one or more implementations, a depth image includes a digital image having and/or portraying geometric depth information from a captured perspective. In various implementations, a depth image portrays objects, surfaces, edges, and/or planes in an image located at different depths. Depth images may also include depth maps (or inverse depth maps) that indicate captured geometric depth information (aka depth data) for a digital image, such as the distance from a viewpoint to surfaces of objects, planes, and edges in the digital image. Examples of depth maps include a monocular depth prediction generated from a single digital image and a rescaled depth prediction that improves the parameters of a monocular depth prediction. Still further examples of depth images include depth passively estimated from stereo images or dense correspondences. Another example of a depth image includes actively determined depth from Lidar or structured light patterns.

As shown, the environment 100 also includes the server device 108. The server device 108 includes an image reprojection server system 110. For example, in one or more implementations, the image reprojection server system 110 represents and/or provides similar functionality as described herein in connection with the image reprojection system 106. In some implementations, the image reprojection server system 110 supports the image reprojection system 106 on the client device 102.

In one or more implementations, the server device 108 includes all, or a portion of, the image reprojection system 106. For instance, the image reprojection server system 110 learns the parameters (e.g., trains the image reprojection system 106) to generate a depth prediction, a relative camera pose, and/or a reprojected image from a source image and a target image. In various implementations, the client device 102 then obtains the image reprojection system 106 from image reprojection server system 110 on the server device 108 (e.g., downloads the image reprojection system 106). Once downloaded or otherwise obtained, in one or more implementations, the client device 102 is able to use the image reprojection system 106 to generate a depth prediction, a relative camera pose, a reprojected image from a source image and a target image and/or a composite image from a reprojected image independent from the server device 108.

In some implementations, the image reprojection server system 110 includes a web hosting application that allows the client device 102 to interact with content and services hosted on the server device 108. To illustrate, in one or more implementations, the client device 102 accesses a web page supported by the server device 108. For example, the client device 102 provides a source image and a target image to the server device 108, and, in response, the image reprojection server system 110 on the server device 108 generates a rescaled depth prediction and/or a refined composite image. The server device 108 then provides the rescaled depth prediction and/or the refined composite image to a user via the image reprojection system 106 on the client device 102.

Although FIG. 1 illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

Figure 2:
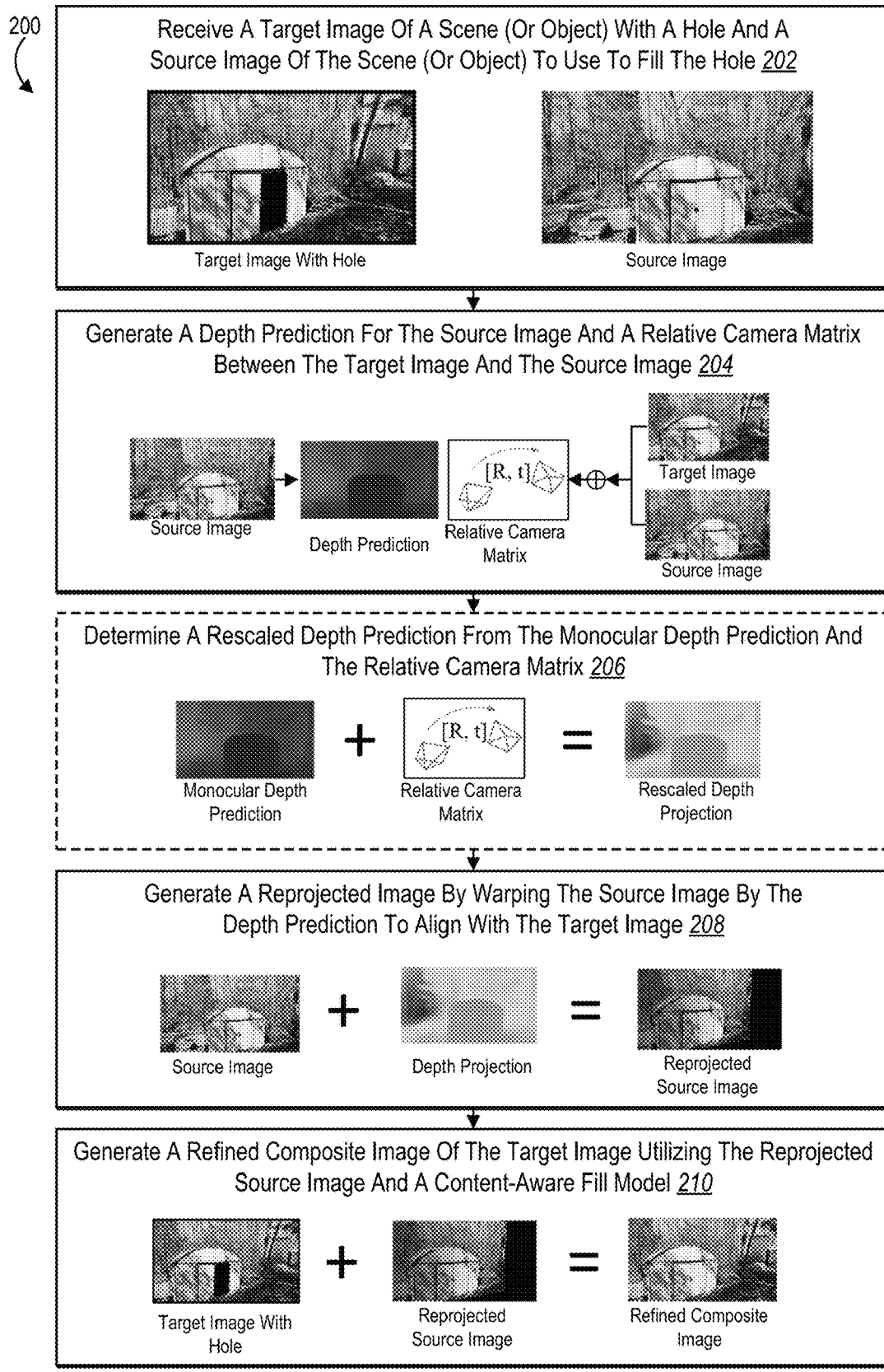
FIG. 2 illustrates an overview flow diagram of generating a reprojected source image as well as a refined composite image from a source and a target image pair in accordance with one or more implementations.

Turning to FIG. 2, this figure illustrates an overview flow diagram of generating a reprojected source image as well as a refined composite image from a source image and a target image in accordance with one or more implementations. As shown, FIG. 2 includes a series of acts 200 performed by the image reprojection system 106. In some implementations, the image editing system 104 performs one or more of the acts from the series of acts 200.

As shown in FIG. 2, the series of acts 200 includes an act 202 of receiving a target image of a scene (or object) with a hole and a source image of the scene (or object). For example, the image reprojection system 106 receives a target image and a source image from a user or another system. In addition, in one or more implementations, the image reprojection system 106 receives a hole removing a portion of the target image from the user or another system. For instance, the hole corresponds to an unwanted object or other occlusions in the target image.

As shown, the series of acts 200 includes an act 204 of generating a depth prediction for the source image and a relative camera matrix between the target image and the source image. For example, in various implementations, the image reprojection system 106 generates a monocular depth prediction of the source image utilizing a depth prediction neural network. In alternative implementations, the image reprojection system 106 generates passively generates a depth prediction from stereo images or estimations from dense correspondences. In still further implementations, the image reprojection system 106 actively generates the depth prediction when capturing the image, such as by using Lidar or structured light patterns. Additionally, in some implementations, the image reprojection system 106 generates a relative camera matrix (e.g., relative camera pose) between the source image and the target image. In one or more implementations, the image reprojection system 106 utilizes an order-aware neural network to determine the relative camera matrix. Additional detail regarding generating a depth prediction is provided below in connection with FIGS. 4A-4B. Further, additional detail regarding generating a relative camera matrix is provided below in connection with FIG. 5.

As shown, the series of acts 200 optionally includes an act 206 of determining a rescaled depth prediction. The series of acts 200 includes the act 206 when the depth prediction comprises a monocular depth prediction with an unknown scale factor. As shown, act 206 involves determining a rescaled depth prediction from the monocular depth prediction and the relative camera matrix. For instance, in one or more implementations, the image reprojection system 106 determines a scale and an offset that aligns the monocular depth prediction with the relative camera matrix. Additionally, in various implementations, the image reprojection system 106 utilizes the scale and offset to generate a rescaled depth prediction from the monocular depth prediction. Additional detail regarding determining the scale and offset is provided below in connection with FIG. 6. Further, additional detail regarding generating a rescaled depth prediction is provided below in connection with FIG. 7.

As shown, the series of acts 200 includes an act 208 of generating a reprojected image by warping the source image by the depth prediction to align with the target image. In one or more implementations, the image reprojection system 106 utilizes the rescaled depth prediction to warp the source image to align with the geometry of the target image. In one or more implementations, the reprojected image comprises the entire source image warped to align with the target image. In alternative implementations, the reprojected image comprises a portion of the source image (e.g., the portion(s) of the source image corresponding to the hole in the target image). Additional detail regarding generating a reprojected source image is provided below in connection with FIG. 3.

In various implementations, the image reprojection system 106 additionally utilizes an optimization pipeline to refine the reprojected source image. For instance, the image reprojection system 106 refines the warping parameters, such as parameters of the monocular depth prediction (e.g., depth and offset) as well as parameters of the relative camera matrix (e.g., camera rotation and translation), which results in generating a more refined reprojected source image. Examples of optimization functions in the optimization pipeline include a least squares function, a negative depth penalty function, a multi-scale photometric function, and/or a feature correspondence function. Additional detail regarding utilizing an optimization pipeline to refine warping parameters is provided below in connection with FIG. 8.

As shown, the series of acts 200 includes an act 210 of generating a refined composite image of the target image utilizing the reprojected source image and a content-aware fill model. For instance, in one or more implementations, the image reprojection system 106 utilizes a content-aware fill model to blend, match, and smooth colors and/or object alignments between filled pixels in the hole with pixels outside of the hole.

To elaborate, in various implementations, the image reprojection system 106 provides a content-aware fill model with the reprojected source image (or one or more depth predictions), the target image, and an image hole mask indicating an area in a target image to be replaced (e.g., a hole). Utilizing the inputs, the content-aware fill model fills the hole in the target image based on the reprojected source image. In addition, in various implementations, the content-aware fill model corrects minor color and spatial discrepancies between content within the hole to match adjacent content outside of the hole. Additional detail regarding utilizing a content-aware fill model is provided below in connection with FIGS. 9A-9B.

In some implementations, the image editing system 104 performs some or all of the act 210. For example, in one or more implementations, the image reprojection system 106 generates an initial image that fills a hole in the target image with a portion of the reprojected source image while the image editing system 104 utilizes a content-aware fill model to generate a refined composite image.

As mentioned above, in one or more implementations, the image reprojection system 106 operates in connection with user input. For example, the series of acts 200 is performed within an image editing application. For instance, the image reprojection system 106 detects a user selecting an object or area to remove in a target image (e.g., the hole) as well as a selection of a source image. In response, the image reprojection system 106 follows the series of acts 200 to generate and provide the refined composite image (e.g., the target image with the hole accurately filled in) for display to the user.

Figure 3:
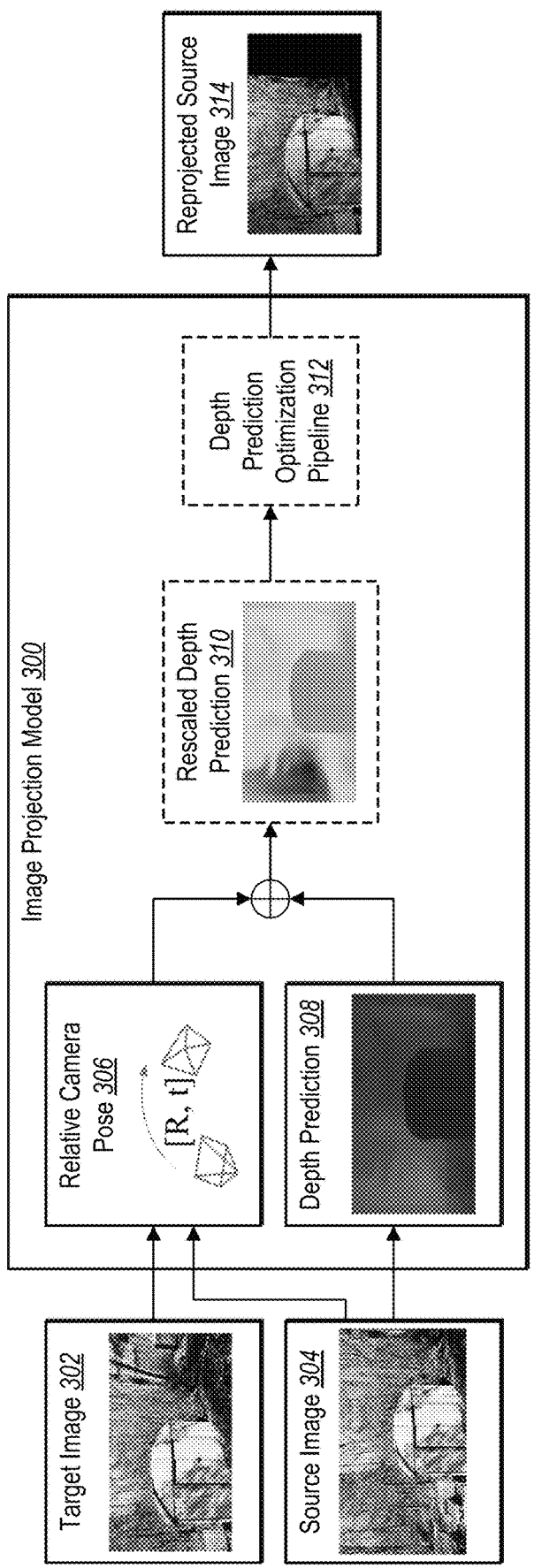
FIG. 3 illustrates an overview block diagram of generating a reprojected source image in accordance with one or more implementations.

As mentioned above, FIG. 3 provides detail regarding generating a reprojected source image. For instance, FIG. 3 illustrates an overview block diagram of the image reprojection system 106 generating a reprojected image in accordance with one or more implementations. As shown, FIG. 3 includes a target image 302, a source image 304, a relative camera pose 306, a depth prediction 308, an optional rescaled depth prediction 310, and a reprojected source image 314. Additionally, FIG. 3 also optionally includes a depth prediction optimization pipeline 312.

As shown, the image reprojection system 106 first identifies, receives, or otherwise obtains the target image 302 and the source image 304 (or multiple source images). As mentioned above, in various implementations, the image reprojection system 106 generates a depth prediction of the source image 304 (or for each of the source images). In particular, in one or more implementations, the depth prediction is actively generated in connection with capturing the source image 304. For example, in one or more implementations, a client device that captures the source image includes hardware and/or software for generating a depth prediction 308 in connection with capturing the source image 304. As non-limiting examples, generating the depth prediction 308 optionally involves using Lidar or structured light patterns that allow the client device to estimate depth at a time of image capture. Alternatively, the image reprojection system 106 estimates the depth prediction 308 from stereo images. For instance, in one or more implementations, the image reprojection system 106 utilizes the techniques described by Zhang et al. in DispSegNet: Leveraging Semantics for End-to-End Learning of Disparity Estimation from Stereo Imagery, IEEE Robotics and Automation Letters, vol. 4, no. 2, pp. 1162-1169, April 2019, available at https://arxiv.org/abs/1809.04734, the entire contents of which is hereby incorporated by reference, to generate the depth prediction 308 form a pair of stereo images (e.g., the source image 304 and a corresponding stereo image (optionally the target image 302 in one or more implementations)). In still further implementations, the image reprojection system 106 estimates the depth prediction 308 from dense correspondences. For example, in one or more implementations, the image reprojection system 106 utilizes the techniques described by Truong et al. in *Learning Accurate Dense Correspondences and When To Trust Them*, Proceedings of the IEEE/CVF Conference on Computer Vision and Pattern Recognition (CVPR), 2021, pp. 5714-5724, the entire contents of which are hereby incorporated by reference. In still further implementations, the image reprojection system 106 utilizes a depth prediction machine-learning model and/or neural network to generate the depth prediction 308 in the form of a monocular depth prediction. Additional detail regarding generating a monocular depth prediction is provided below in connection with FIGS. 4A-4B.

For context, the term machine-learning model refers to computer-implemented algorithms that model high-level abstractions in data by generating data-driven predictions or decisions from the known input data. Examples of machine-learning models include computer representations that are tunable (e.g., trained) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include decision tree models, random forest models, gradient boosting models, neural networks (e.g., convolutional neural networks), linear regression models, logistical regression models, or support vector machines (SVM) models.

Additionally, the term neural network refers to a machine learning model that can be trained and/or tuned based on inputs to determine classifications or approximate unknown functions. For example, a neural network includes a model of interconnected artificial neurons (e.g., organized in layers) that communicate and learn parameters to approximate complex functions and generate outputs based on inputs provided to the neural network. In some cases, a neural network refers to an algorithm (or set of algorithms) that implements deep learning techniques to model high-level abstractions in data. For example, a neural network can include an object detection neural network, an object mask neural network, a depth prediction neural network, a content-aware fill neural network, a color-spatial transformation neural network, an order-aware neural network, a convolutional neural network (CNN), residual neural network, recurrent neural network (RNN) such as LSTMs, generative adversarial neural network (GAN), single-shot detection (SSD) networks, and/or a combination of multiple neural network types.

Further, as mentioned above, in various implementations, the image reprojection system 106 utilizes a depth prediction neural network to generate monocular depth prediction (i.e., a predicted depth image) from a digital image (e.g., a source image). In many implementations, a monocular depth prediction is a predicted depth image generated by a depth prediction neural network from a single digital image. In various implementations, a monocular depth prediction includes a depth map or an inverse depth map. Additionally, a rescaled depth prediction refers to a predicted depth image generated from a monocular depth prediction and one or more determined warping parameters corresponding to depth (e.g., scale and offset).

As shown in FIG. 3, the image reprojection system 106 generates the relative camera pose 306 (e.g., relative camera matrix) from the target image 302 and the source image 304. For example, in one or more implementations, the image reprojection system 106 generates the relative camera pose 306 based on determining correspondences between points in the target image 302 and the source image 304. Additional detail regarding generating a relative camera matrix is provided below in connection with FIG. 5.

In various implementations, the term relative camera pose refers to a mapping of a first camera pose to a second camera pose. For example, when the source image and the target image are captured from different viewpoints (by the same or different cameras), the relative camera pose indicates rotation and translation information to move between the source camera coordinates to the target camera coordinates. Often, a relative camera pose is represented numerically as a relative camera matrix that includes a mapping of external parameters between the cameras associated with a target image and a source image.

As shown in FIG. 3, the image reprojection system 106 optionally generates the rescaled depth prediction 310. In particular, in cases in which the depth prediction 308 is a monocular depth prediction with unknown scale, the image reprojection system 106 generates the rescaled depth prediction 310. In various implementations, the image reprojection system 106 determines a scale factor and offset variable for aligning the monocular depth prediction and the relative camera pose 306 to a common scale. As described below, many depth prediction neural networks that generate a monocular depth prediction from a digital image have unknown parameter calibrations, as is the case with the scale and offset parameters. Accordingly, in a number of implementations, the image reprojection system 106 determines these parameters and applies them to the monocular depth prediction 308 to generate the rescaled depth prediction 310. As noted above, additional detail regarding determining a scale and offset is provided below in connection with FIG. 6 while additional detail generating a rescaled depth prediction is provided below in connection with FIG. 7.

As shown, the image reprojection system 106 optionally utilizes the depth prediction optimization pipeline 312. For example, the depth prediction optimization pipeline 312 includes one or more optimization functions, including a least squares function, a negative depth penalty function, a multi-scale photometric function, and/or a feature correspondence function. For instance, the image reprojection system 106 jointly optimizes one or more warping parameters in an objective function based on optimization functions included in the depth prediction optimization pipeline 312. As noted above additional detail regarding utilizing an optimization pipeline to refine warping parameters is provided below in connection with FIG. 8.

Further, FIG. 3 shows the image reprojection system 106 generating the reprojected source image 314. In various implementations, the image reprojection system 106 generates the reprojected source image 314 by warping the source image 304 based on the depth prediction 308/310 and/or the relative camera pose 306. In many implementations, the term reprojected image refers to a digital image warped by a set of warping parameters associated with depth information. In some implementations, warping parameters include parameters of the monocular depth prediction such as depth and offset as well as parameters of the relative camera matrix such as camera rotation and translation. More formally, a reprojected image may be represented as $I^{s \to t}$, where $I_s$ refers to a source image and $I_t$ refers to a target image.

In example implementations, the image reprojection system 106 reprojects the source image to align with the target image (e.g., Is-t) utilizing multi-view geometry and camera intrinsic matrices (e.g., focal length, aspect rotation, and skew) or a random guess of the camera intrinsic. To illustrate, for a given homogeneous coordinate of a point on the source image 304, the image reprojection system 106 reprojects the point based on source camera intrinsic parameters, the target camera intrinsic parameters, the relative camera pose between the two cameras, and a corresponding depth value. For example, in various implementations, the image reprojection system 106 applies an inverse intrinsic matrix for the source camera, a depth rescaling factor, the relative camera matrix (i.e., relative camera pose), and the intrinsic matrix for the target camera to the source image point to reproject a point in the source image to align with the target image (e.g., $I_{s \to t}$).

In various implementations, the image reprojection system 106 uses image reprojections to transfer information between a set of similar images and/or for data augmentation. For example, the source image includes labels or annotations for objects or other features included in the image, while the target image is unlabeled or missing annotations included in the source image. Based on reprojecting the source image to align with the target image, the image reprojection system 106 transfers the annotations from the source image to corresponding objects or features in the target image. Along related lines, in one or more implementations, the image reprojection system 106 utilizes image reprojections to train a neural network or other machine learning model to perform a task (e.g., generate rescaled depth predictions or reprojected images). Still further, as explained in greater detail below, the image editing system 106 utilizes the reprojected source image 314 as a guide in filling a hole the target image 302.

Figure 4A:
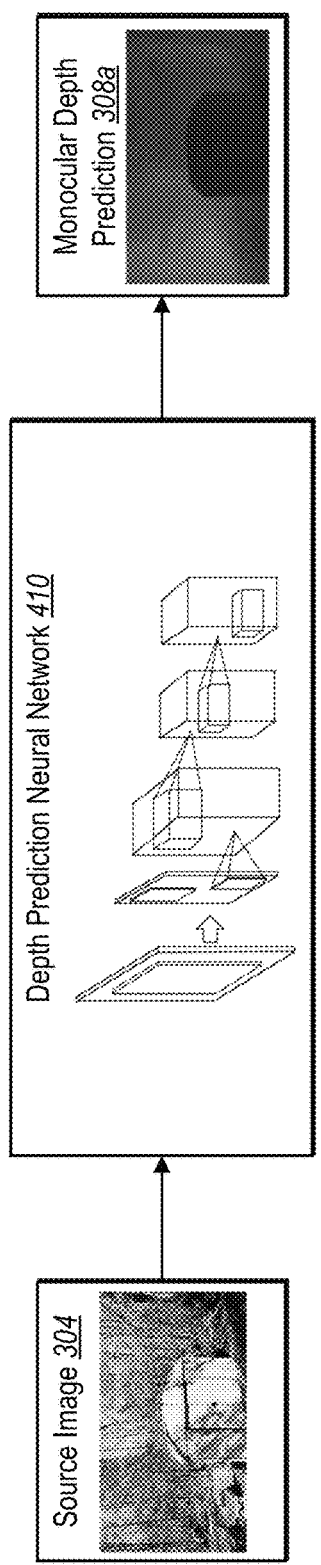
FIGS. 4A-4B illustrate a block diagram and examples of generating a monocular depth prediction in accordance with one or more implementations.
Figure 4B:
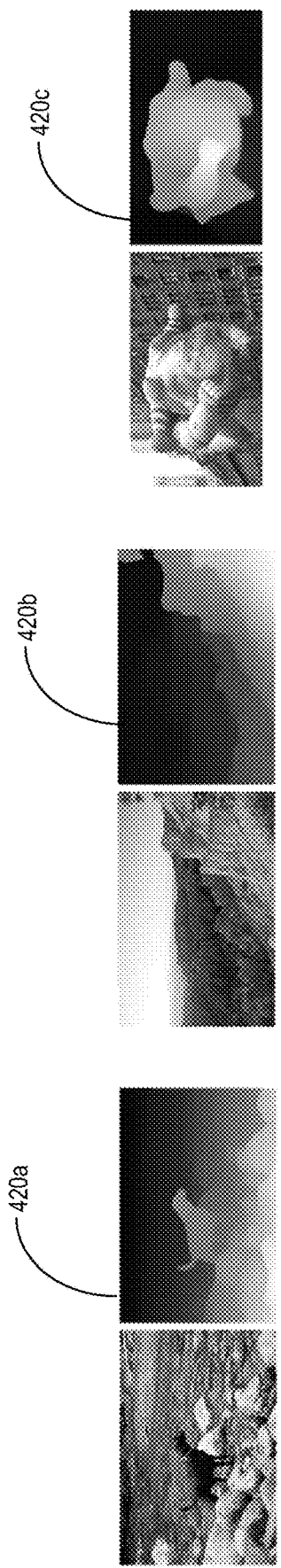

As mentioned above, FIGS. 4A-4B provide additional detail regarding generating a monocular depth prediction. In particular, FIGS. 4A-4B illustrate a block diagram and examples of generating a depth prediction in accordance with one or more implementations. To illustrate, FIG. 4A includes the source image 304, a depth prediction neural network 410, and the monocular depth prediction 308a.

As mentioned above, in various implementations, the depth prediction neural network 410 generates the monocular depth prediction 308a (e.g., a depth map) of the source image 304. In some implementations, the image reprojection system 106 represents the monocular depth prediction 308a as Ds, which is a depth map of the source image 304 (e.g., Is).

In one or more implementations, the depth prediction neural network 410 is a pre-trained model having unknown calibrations. For instance, the depth prediction neural network 410 is a depth prediction neural network having a point cloud model, such as the model found in U.S. patent application Ser. No. 17/186,436, Generating Depth Images Utilizing A Machine-Learning Model Built From Mixed Digital Image Sources And Multiple Loss Function Sets, filed Feb. 26, 2021, which is incorporated herein by reference in its entirety. Alternatively, the depth prediction neural network 410 is a pre-trained monocular depth estimation neural network, such as the monocular depth estimation network described in Towards Robust Monocular Depth Estimation: Mixing Datasets for Zero-shot Cross-dataset Transfer, by R. Ranftl et al., published in IEEE Transactions On Pattern Analysis And Machine Intelligence (2019) at arXiv: 1907.01341, (hereafter "MiDaS") which is incorporated herein by reference in its entirety. In other implementations, the depth prediction neural network 410 is another type of pre-trained depth prediction model that generates monocular depth prediction images.

In any event, the image reprojection system 106 utilizes the depth prediction neural network 410 to encode the a source image 304 into a set of feature maps. The feature maps comprise features at different levels. The image projection system 106 then utilizes the depth prediction neural network 410 to decode the set of feature maps to generate the monocular depth prediction 308a. In one or more implementations, the depth prediction neural network 410 comprises a feedforward ResNet architecture with a progressive refinement process that fuses multi-scale features. The depth prediction neural network 410 also optionally includes an adaptive convolution module that adjust channels of features maps and generates the final monocular depth prediction 308a.

FIG. 4B shows examples of images and their corresponding depth maps. As shown, FIG. 4B shows a first monocular depth prediction 420a of a dog, a second monocular depth prediction 420b of a cliff, and a third monocular depth prediction 420c of a parade balloon. In each of the example monocular depth predictions, the image reprojection system 106 utilizes the depth prediction neural network 410 to generate the depth map from a single image rather than from a pair of images or multiple images. Note, if multiple source images are present, the image reprojection system 106 may generate a separate monocular depth prediction for each source image.

Figure 5:
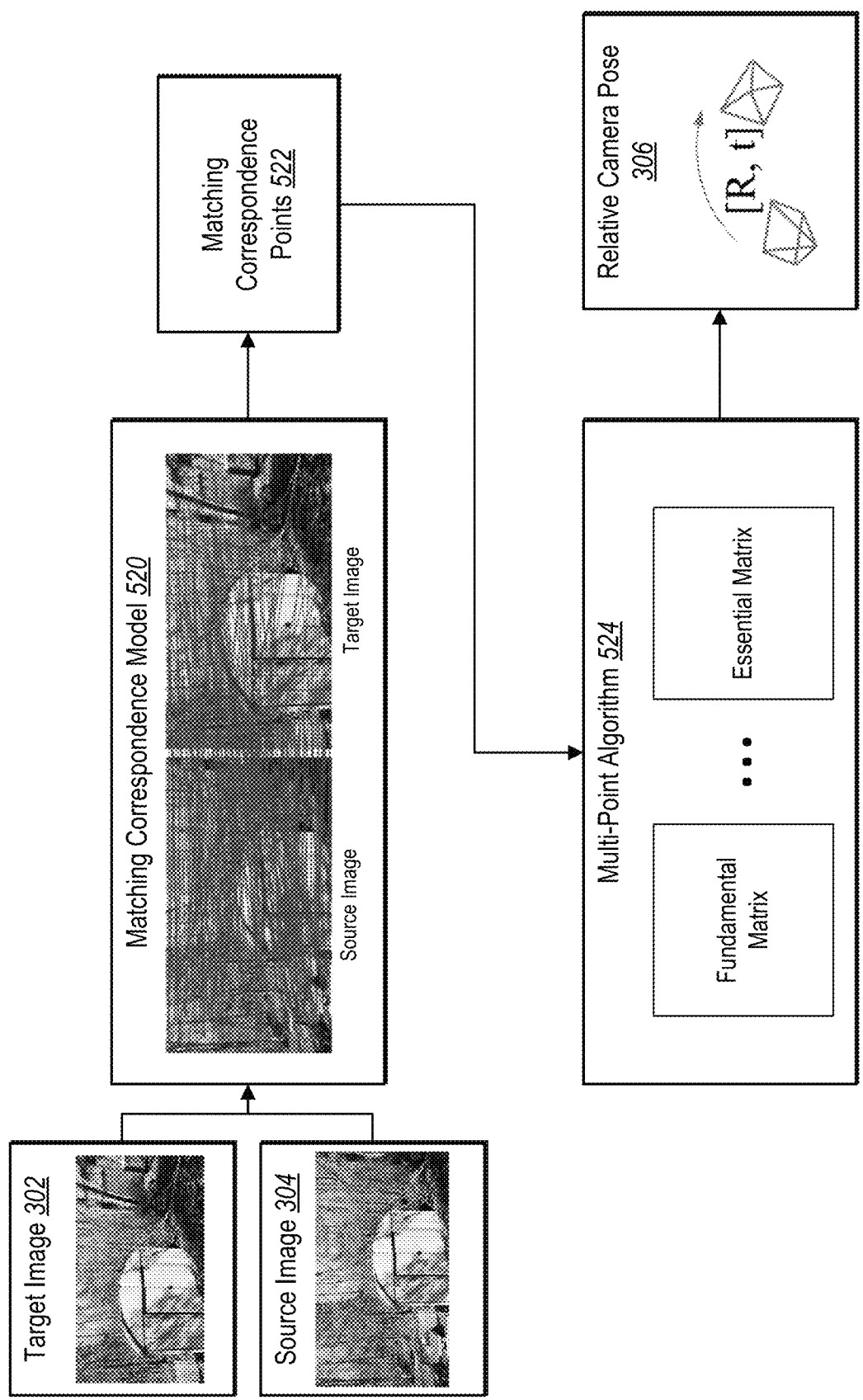
FIG. 5 illustrates a block diagram of determining a relative camera pose between a source camera and a target camera in accordance with one or more implementations.

As mentioned above, FIG. 5 provides additional detail regarding generating a relative camera pose. For instance, FIG. 5 illustrates a block diagram of determining a relative camera pose between a source camera and a target camera in accordance with one or more implementations. As shown, FIG. 5 includes the target image 302, the source image 304, a matching correspondence model 520, matching correspondence points 522, a multi-point algorithm 524, and the relative camera pose 306.

As provided above, in one or more implementations, the image reprojection system 106 generates the relative camera pose 306 from the target image 302 and the source image 304. For instance, the relative camera pose 306 provides a mapping from camera parameters of a first camera that captured the source image 304 to camera parameters of a second camera that captured the target image 302. In some implementations, the first and second cameras are the same camera at different locations, positions, and/or orientations. In alternative implementations, the first and second cameras are different cameras.

More specifically, as shown in FIG. 5, the image reprojection system 106 utilizes the matching correspondence model 520 to generate matching correspondence points 522 from the target image 302 and the source image 304. In various implementations, the matching correspondence model 520 is a pre-trained model that determines matching correspondences between a pair of related images. For example, in one or more implementations, the matching correspondence model 520 comprises a feature-based alignment model as described in U.S. Pat. No. 10,783,649, entitled "Aligning Digital Images By Selectively Applying Pixel-Adjusted-Gyroscope Alignment And Feature-Based Alignment Models," which is hereby incorporated by reference in its entirety. Alternatively, the matching correspondence model 520 comprises a scale invariant feature transform (SIFT) and/or an order-aware neural network (OANet), such as the network(s) described in *Learning Two-View Correspondences And Geometry Using Order-Aware Network*, by J. Zhang et al., published on pages 5845-54 in Proceedings of the IEEE/CVF International Conference on Computer Vision (2019), which is incorporated herein by reference in its entirety.

In still further implementations, the image reprojection system 106 utilizes one or more of the models described in SuperPoint: Self-Supervised Interest Point Detection and Description, by D. DeTone et al., found in CVPR 2018 Deep Learning for Visual SLAM Workshop (2020) and/or Super-Glue: Learning Feature Matching with Graph Neural Networks, by PE. Sarlin et at., found at pages 4938-47 in Proceedings of the IEEE/CVF Conference on Computer Vision and Pattern Recognition (CVPR) (2020), both of which are incorporated herein by reference in their entirety. In other implementations, the image reprojection system 106 utilizes another type of matching correspondence model to generate the matching correspondence points 522.

As shown in FIG. 5, the matching correspondence model 520 determines 2D correspondences between points (or features) in the target image 302 and the source image 304. In particular, FIG. 5 illustrates lines that match points in the source image 304 on the left with corresponding points in the target image 302 on the right. In one or more implementations, the term matching correspondence points refers to a set of points between two images. For instance, in various implementations, matching correspondence points refer to matching local features between a first image and a second image. In some implementations, the image reprojection system 106 represents 2D correspondence matching points as $\{P_s, P_t\}$. Notably, not all points in the target image 302 map to points in the source image 304, creating a sparse matching correspondence.

Additionally, as shown, the image reprojection system 106 utilizes the multi-point algorithm 524 to generate the relative camera pose 306 from the matching correspondence points 522. For instance, in various implementations, the multi-point algorithm 524 represents an 8-point algorithm such as described in *Multiple View Geometry in Computer Vision*, by A. Andrew at pages 1333-41 in Kybernetes (2001), which is incorporated herein by reference in its entirety. In alternative implementations, the multi-point algorithm 524 is another type of multi-point algorithm, such as a 6-point algorithm, a 7-point algorithm, a random sample consensus algorithm (RANSAC), and/or a combination of algorithms (e.g., RANSAC+a 7-point algorithm).

As shown in FIG. 5, in some implementations, the multi-point algorithm 524 utilizes one or more fundamental matrices and/or one or more essential matrices. For instance, in particular implementations, the image reprojection system 106 determines a fundamental matrix (i.e., F) from the matching correspondence points 522. Additionally, the image reprojection system 106 generates an essential matrix (i.e., E) from the fundamental matrix. Further, the image reprojection system 106 generates the relative camera pose 306 from the essential matrix.

Figure 6:
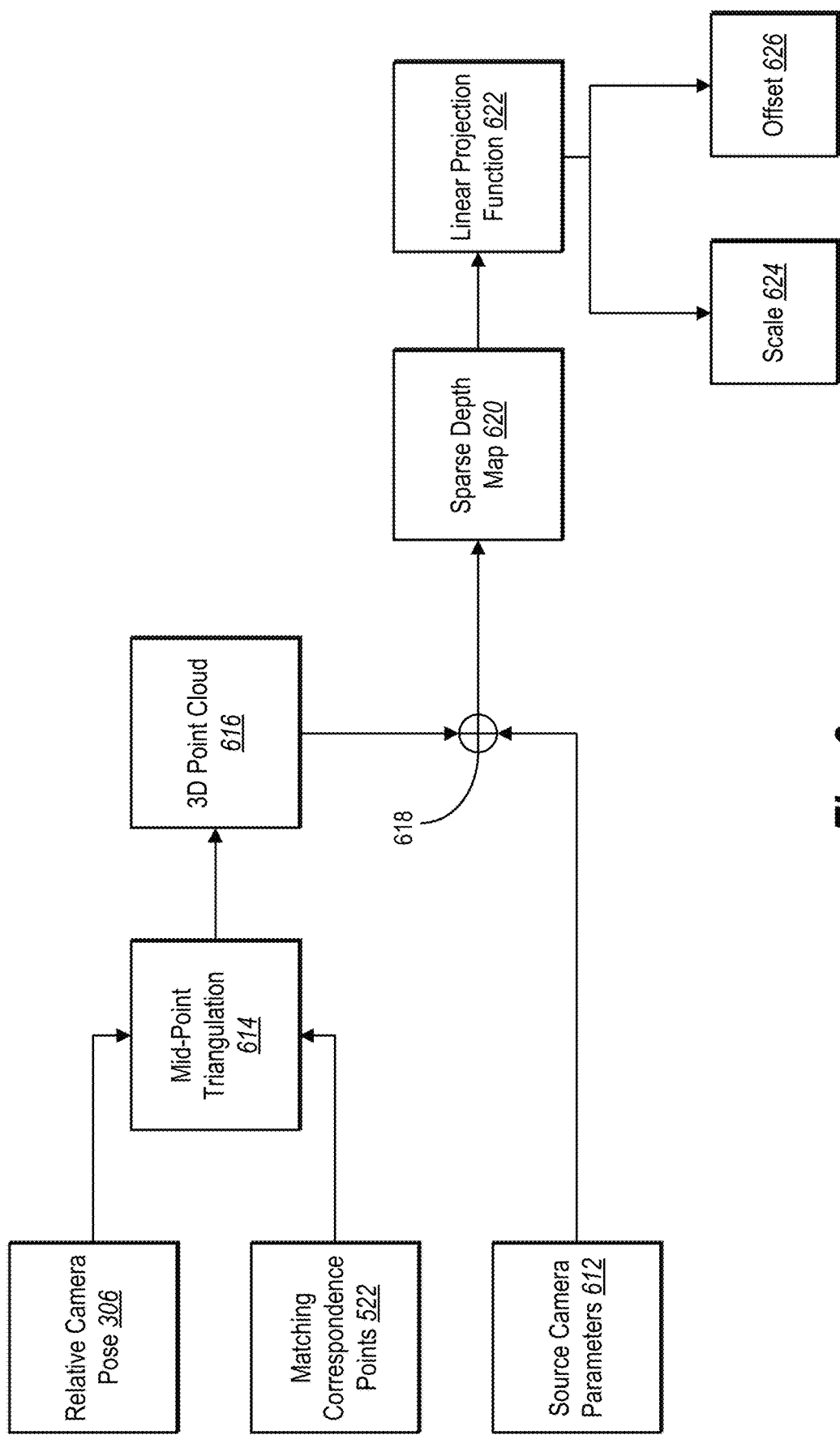
FIG. 6 illustrates a block diagram of determining a scale factor and an offset value in accordance with one or more implementations.

As mentioned above, FIG. 6 provides additional detail regarding determining a scale and an offset for a distributed pruning parameter. For instance, FIG. 6 illustrates a block diagram of determining the scale and offset parameters in accordance with one or more implementations. As shown, FIG. 6 includes the relative camera pose 306, the matching correspondence points 522, source camera parameters 612, a mid-point triangulation 614, a 3D point cloud 616, a projection function 618, a sparse depth map 620, a linear projection function 622, a scale 624 (i.e., a scale factor), and an offset 626 (i.e., an offset variable).

As provided above, in one or more implementations (e.g., when the depth prediction is a monocular depth prediction with unknown scale), the image reprojection system 106 determines a scale factor and an offset variable that aligns the monocular depth prediction and the relative camera pose. To elaborate, in various implementations, the image reprojection system 106 utilizes pre-trained models (e.g., neural networks) to determine the monocular depth prediction and/or relative camera pose, as described above. Because these pre-trained models are often trained and tuned with unknown and/or uncalibrated parameters (e.g., depth parameters and/or camera parameters), the image reprojection system 106 cannot correlate output from one pre-trained model (e.g., a depth prediction neural network) with the output of another model (pre-trained e.g., an OANet) even if both pre-trained models utilized the same input (e.g., the source image and the target image).

In addition to trained models often generating a monocular depth prediction with an unknown scale and offset, in many cases, pre-trained models often introduce errors in the monocular depth prediction and the relative camera pose. Accordingly, before using the monocular depth prediction 308a and the relative camera pose 306 to generate a reprojected image, the image reprojection system 106 first aligns corresponding factors as well as reduces errors, as shown in FIG. 6.

To illustrate, FIG. 6 shows the image reprojection system 106 utilizing the mid-point triangulation 614 to generate the 3D point cloud 616 from the relative camera pose 306 and the matching correspondence points 522. For instance, in one or more implementations, the image reprojection system 106 determines anchor points from the matching correspondence points 522 (e.g., feature matching points) utilizing the mid-point triangulation 614, which builds a 3D structure (e.g., the 3D point cloud 616) from the 2D correspondences. For example, the image reprojection system 106 utilizes the mid-point triangulation 614 to apply classic mid-point triangulation on each of the matching correspondence points 522 along with the relative pose information to determine the 3D point cloud 616 based on each of the matching points.

As shown in FIG. 6, the image reprojection system 106 combines the 3D point cloud 616 with the source camera parameters 612 to generate the sparse depth map 620. More particularly, in various implementations, the image reprojection system 106 utilizes the 3D point cloud 616 as a quasi-ground truth or target to align the monocular depth prediction with the sparse depth map 620. To illustrate, in various implementations, the image reprojection system 106 utilizes the projection function 618 to project the 3D point cloud 616 of matching points to the source camera parameters 612 to creates the sparse depth map 620 (e.g., a sparse triangulated depth map). In some implementations, the sparse depth map 620 includes depth information from the matching correspondence points 522 for which triangulation was performed, which is only a subset of points between the source image and the target image. In example implementations, the sparse depth map 620 is represented as $D_{tri}$.

As also shown, the image reprojection system 106 determines the scale 624 and the offset 626 from the sparse depth map 620 utilizing the linear projection function 622. In various implementations, the term scale (i.e., s) refers to a scale factor that enlarges or decreases the depth of a depth map, such as the monocular depth prediction. In some implementations, the term offset (i.e., d) refers to an offset variable or value that indicates displacement between two data structures (e.g., a monocular depth prediction and relative camera pose). In example implementations, the scale and offset are both scalars.

As mentioned above, the image reprojection system 106 solves the linear projection function 622 to estimate the scale 624 and the offset 626 associated with the sparse triangulated depth map. In one or more implementations, the linear projection function 622 is a linear least square function and/or least squared approximation linear function determined from the sparse points in the sparse depth map 620 (i.e., $D_{tri}$).

Figure 7:
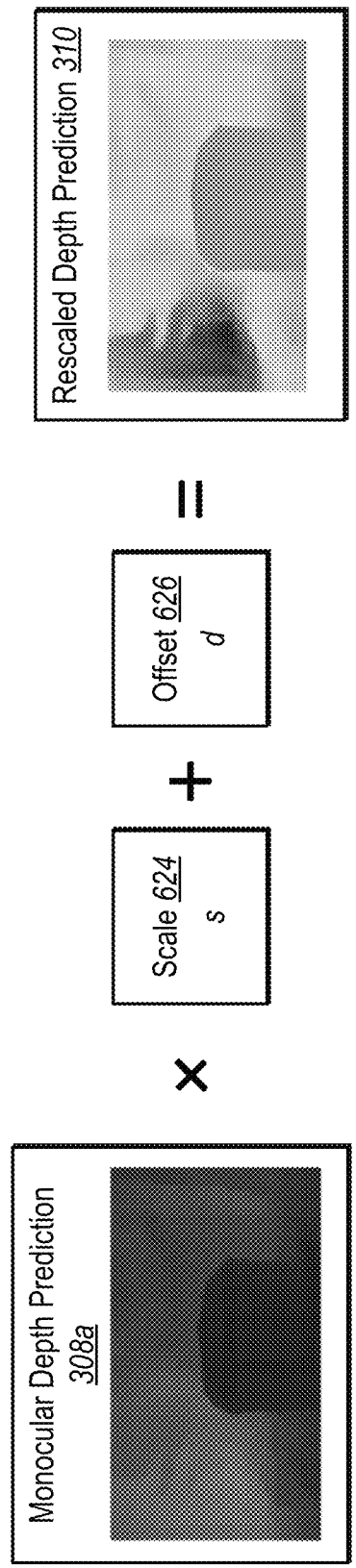
FIG. 7 illustrates a block diagram of determining a rescaled depth prediction in accordance with one or more implementations.

As mentioned above, FIG. 7 provides additional detail regarding generating a rescaled depth prediction. For instance, FIG. 7 illustrates a block diagram of determining a rescaled depth prediction in accordance with one or more implementations. As shown, FIG. 7 includes the monocular depth prediction 308a, the scale 624, the offset 626, and the rescaled depth prediction 310.

As shown, the image reprojection system 106 combines the monocular depth prediction 308a with the scale 624 to scale the monocular depth prediction 308a to the same scale as the relative camera pose 306 (e.g., the relative camera matrix). Additionally, the image reprojection system 106 applies the offset 626 to the scaled monocular depth prediction to orient the monocular depth prediction with the relative camera pose 306. As a result, the image reprojection system 106 generates the rescaled depth prediction 310.

In various implementations, the image reprojection system 106 represents the rescaled depth prediction 310 as $D_s^r$, where s indicates the source image depth map (i.e., $D_s$ or the monocular depth prediction) and r indicates a rescaled version of the depth map. Accordingly, in various implementations, the image reprojection system 106 generates the rescaled depth prediction 310 (e.g., rescaled depth map) as $D_s^r = D_s \times s + d$.

As described above, the image reprojection system 106 may generate a reprojected source image from a depth prediction 308/310 (e.g., the depth prediction 308, a monocular depth 308, or the rescaled depth prediction 310). In various implementations, to generate a more accurate reprojected image, the image reprojection system 106 first refines warping parameters of the depth prediction 308/310 (resulting in a refined depth prediction). To elaborate, in various implementations, the image reprojection system 106 utilizes pre-trained models, as mentioned above. As a result, these pre-trained models often generate outliers in matching correspondence points. As an outlier example, for a pair of images of the same car, a set of outlier matching correspondence points may match the front tire in one image to the rear tire in the second image. To mitigate these and other errors, in one or more implementations, the image reprojection system 106 utilizes an optimization pipeline to improve alignment before reprojecting pixels to a reprojected source image.

In one or more implementations, the image reprojection system 106 performs a step for generating a refined depth prediction from a depth prediction of the source image. The above description of FIGS. 3-7, particularly the description of the acts involved in determining the scale factor and offset variable, provide supporting acts and algorithms for performing a step for generating a refined depth prediction from the depth prediction of the source image.

Figure 8:
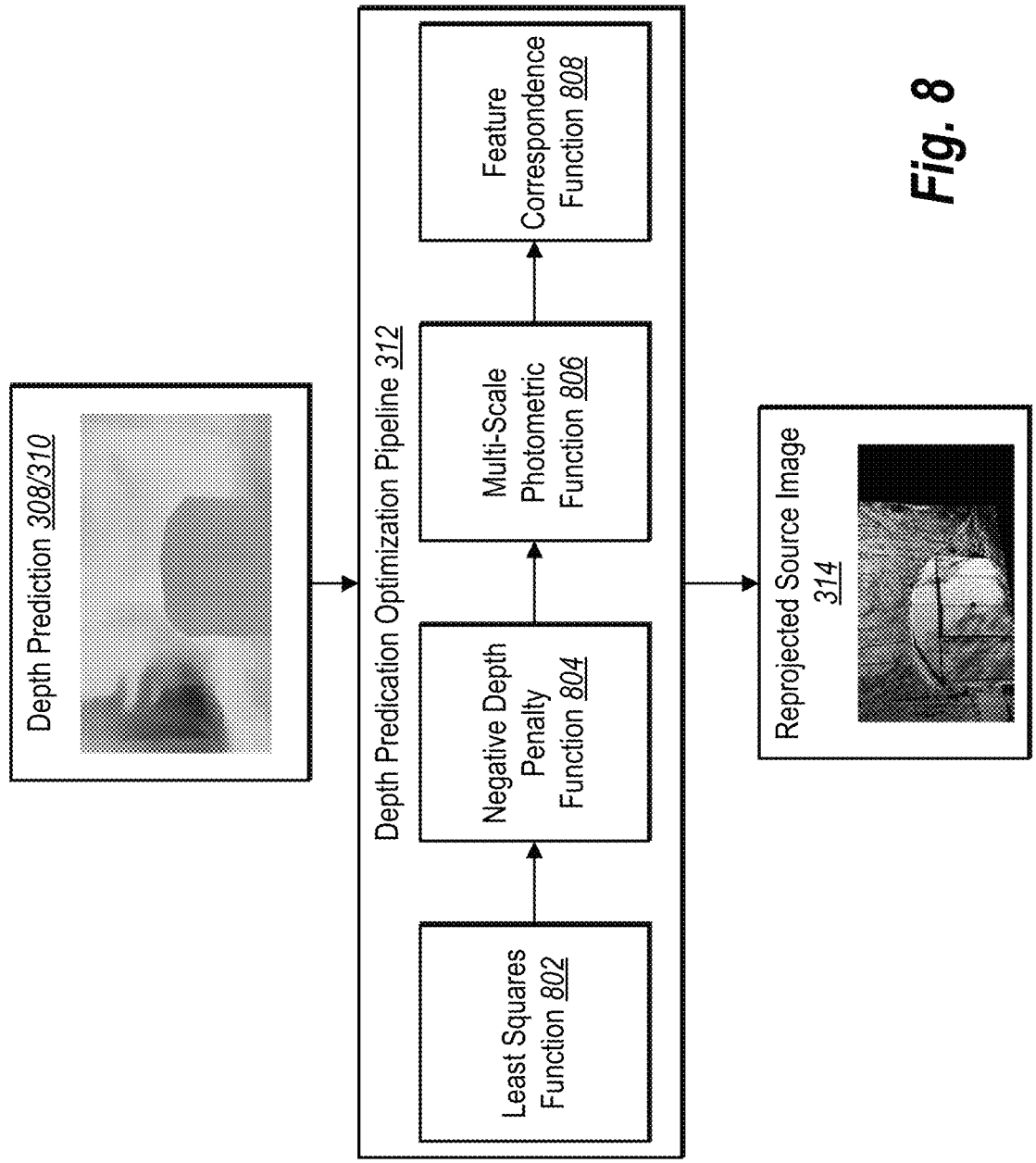
FIG. 8 illustrates a block diagram of optimizing a depth prediction in accordance with one or more implementations.

To illustrate, FIG. 8 shows a block diagram of optimizing warping parameters in accordance with one or more implementations. Indeed, FIG. 8 provides additional detail regarding utilizing an optimization pipeline to refine the warping parameters. As shown, FIG. 8 includes the depth prediction 308/310, the depth prediction optimization pipeline 312, and the reprojected source image 314. In addition, the depth prediction optimization pipeline 312 includes various optimization functions, such as a least squares function 802, a negative depth penalty function 804, a multi-scale photometric function 806, and a feature correspondence function 808.

As described below, in one or more implementations, the image reprojection system 106 utilizes the depth prediction optimization pipeline 312 to jointly optimize the warping parameters (e.g., depth rescaling factors such as scale and offset as well as relative camera pose factors such as rotation and translation). In some implementations, the depth prediction optimization pipeline 312 includes an Adam optimizer. In alternative implementations, the depth prediction optimization pipeline 312 includes a non-linear least squares method such as Levenberg-Marquardt.

To elaborate, in some implementations, the image reprojection system 106 converts the warping parameters into quaternions, which enables optimization of up to nine parameters. For instance, the parameters include a scale factor, an offset variable, at least three factors for camera rotation, and/or at least three factors for camera translation. In some instances, the relative camera pose includes an additional parameter (e.g., at least four camera factors).

As mentioned above, the depth prediction optimization pipeline 312 includes the least squares function 802. In various implementations, the least squares function 802 ensures that the warping parameters are optimized to nearby locations that are within a threshold of their initial estimation rather than to a random location. In some implementations, the least squares function 802 applies to each of the optimization functions in the depth prediction optimization pipeline 312.

In one or more implementations, the least squares function 802 is represented based on the formulation shown in Equation 1 below.

$$l_{lsq} = \frac{1}{|M_{tri}|} \sum (D_{tri} \odot M_{tri} - D_s^r \odot M_{tri})^2 \quad (1)$$

In Equation 1, $M_{tri}$ refers to a binary mask where 1 indicates a valid reprojection point and 0 represents an empty reprojection point. In addition, $|M_{tri}|$ refers to the number of reprojected points in the triangulated depth map (i.e., the sparse depth map 620). As noted above, $D_{tri}$ refers to the sparse points in the sparse depth map 620 and D' refers to the rescaled depth prediction 310. In various implementations, the sparse depth map 620 (i.e., $D_{tri}$) is fixed while the image reprojection system 106 optimizes the rescaled depth prediction 310 (i.e., $D_s^r$). In this manner, the image reprojection system 106 utilizes the least squares function 802 to optimize the depth information to improved values while avoiding moving too far from the initial estimations.

As mentioned above, the depth prediction optimization pipeline 312 includes the negative depth penalty function 804. In one or more implementations, the negative depth penalty function 804 reduces the number of negative pixels after rescaling. To elaborate, depth points should be positive, meaning in front of a target camera upon reprojecting the source image to align with the homography of the target image (captured by the target camera). Accordingly, the negative depth penalty function 804 may reduce and/or remove negative pixels by penalizes to points positioned behind the target camera. In one or more implementations, the negative depth penalty function 804 is represented based on the formulation shown in Equation 2 below.

$$l_{neg} = \Sigma \max\{0, -D_s^r\} \quad (2)$$

As shown in Equation 2, when a rescaled point is positive (e.g., in front of the camera), the point is counted as zero. Otherwise, if a rescaled point is negative, a penalty will be applied to the rescaling, which is shown by the negative sign in front of the rescaled depth prediction (i.e., $-D_s^r$). In various implementations, the negative depth penalty function 804 is a hinge loss optimization function.

As mentioned above, the depth prediction optimization pipeline 312 includes the multi-scale photometric function 806. In one or more implementations, the multi-scale photometric function 806 measures the color difference between the warped image (i.e., rescaled depth prediction 310) and the target image. In some implementations, the multi-scale photometric function 806 measures the color difference between the warped image and the target image outside of the hole region (e.g., an image hole mask) of an initial composite image that fills a hole (i.e., image hole mask M) in a target image with corresponding pixels from the reprojected source image 314.

To elaborate, in implementations that utilize the image hole mask M, the image hole mask M may filter pixels that are in the target image outside of the hole from pixels in the hole corresponding to the reprojected source image. In additional implementations, the image hole mask M may also filter out undefined pixels from the reprojected source image not included in the target image.

In one or more implementations, when utilizing the multi-scale photometric function 806, the image reprojection system 106 builds Gaussian pyramids on both the rescaled depth prediction 310 (e.g., $I_{s \to t}$) and the target image (e.g., $I_t$) utilizing an RGB representation of the source image and an alpha-pre-multiplied RGBA representation of the target image to incorporate the hole region properly into the target image. In these implementations, the image reprojection system 106 may utilize a coarse-to-fine learning strategy by first determining photometric loss on the coarsest level and moving to the finer levels once convergence criteria are met.

In one or more implementations, the multi-scale photometric function 806 is represented based on the formulation shown in Equation 3 below.

$$l_{photo} = \frac{1}{|M|} \sum (I_{s \to t} \odot M - I_t \odot M)^2 \quad (3)$$

As noted above, in various implementations, the term M refers to valid pixels (e.g., pixels having a correspondence matching) that are in the target image and outside of the image hole mask. As also noted above, in various implementations, pixels from the source image are reprojected to a sparse set of pixels in the target image and only the sparse pixels outside of the image hole mask are considered in Equation 3. Additionally, in example implementations, the image reprojection system 106 utilizes Equation 3 after performing a pixelwise division with an alpha to recover non-alpha-pre-multiplied colors.

In some implementations, the image reprojection system 106 first runs a color correction mechanism to compensate for different auto exposures in the source and target images. In this manner, the image reprojection system 106 compensates for different camera auto exposures and to more closely align the images before utilizing the multi-scale photometric function 806, which may result in improved optimization.

As mentioned above, the depth prediction optimization pipeline 312 includes the feature correspondence function 808. In one or more implementations, the feature correspondence function 808 measures the distance between reprojected matching feature points in the source image and the target image. In one or more implementations, the image reprojection system 106 utilizes a robust function as part of the feature correspondence function 808 to lessen the effect of outliers as the loss becomes larger.

To illustrate, in various implementations, to reduce the effects of the outliers, the image reprojection system 106 utilizes an adaptive robust function, as shown in Equation 4 below.

$$f(x, \alpha, c) = \frac{|\alpha - 2|}{\alpha} \left( \left( \frac{(x/c)^2}{|\alpha - 2|} + 1 \right)^{\frac{\alpha}{2}} - 1 \right) \quad (4)$$

In various implementations, the image reprojection system 106 utilizes the formulation in Equation 4 to measure the distance between reprojected matching feature points in the reprojected source image and the target image. In Equation 4, $\alpha$ refers to a shape parameter and c refers to a scale parameter. In some implementations, the image reprojection system 106 utilizes −2 for the shape parameter (i.e., $\alpha$=2) and 10 for the scale parameter (i.e., c=10). Additional detail regarding Equation 4 is described in *A General and Adaptive Robust Loss Function*, by J. T. Barron on pages 4331-39 in Proceedings of the IEEE/CVF Conference on Computer Vision and Pattern Recognition (2019), which is incorporated herein by reference in its entirety. In some implementations, the image reprojection system 106 utilizes one or more other robust loss functions.

In one or more implementations, the feature correspondence function 808 is represented based on the formulation shown in Equation 5 below. As noted above, in one or more implementations, the matching correspondence points are represented as $\{P_s, P_r\}$.

$$l_{feat} = \frac{1}{|P_{s \to t}|} \sum_{i=0}^{|P_{s \to t}|} f(x = (q_{s \to t}^i - q_t^i)) \quad (5)$$

In Equation 5, $\{P_s, P_r\}$ correspond to the set of reprojected matching correspondence points. Indeed, in one or more implementations, the image reprojection system 106 reprojects the matching correspondence points in $P_s$ to determine $P_{s \to t}$, where $P_{s \to t}$ refers to the set of feature points from the reprojected source image reprojected to the target. Additionally, in Equation 5, f refers to the adaptive robust function of Equation 4, $q_{s \to t}^i$ refers to the i-th feature point in the $P_{s \to t}$, and qi refers to the i-th feature point in the target image, Pt. Accordingly, as shown in Equation 5, in some implementations, the image reprojection system 106 first provides the difference between matching feature points in the reprojected source image and the target image to the adaptive robust function of Equation 4, then sums these results and divides by the summed result by the number of matching correspondence points (e.g., $P_{s \to t}$).

In various implementations, the image reprojection system 106 utilizes an objective function that combines one or more of the optimization functions in the depth prediction optimization pipeline 312, as shown below in Equation 6. In Equation 6, $\lambda_1$, $\lambda_2$, $\lambda_3$, and $\lambda_4$ refer to weights for each optimization function.

$$\text{Objective Function} = \lambda_1 l_{lsq} + \lambda_2 l_{negt} + \lambda_3 l_{photo} + \lambda_4 l_{feat} \quad (6)$$

Moreover, in various implementations, the image reprojection system 106 validates convergence of the objective function. In some cases, the image reprojection system 106 evaluates a previous number of iterations (e.g., 10 iterations) by comparing values from a first subset of iterations (e.g., the first 5 iterations) to a second subset (e.g., the last 5 iterations). For example, in one or more implementations, the image reprojection system 106 utilizes the formulation shown in Equation 7 below to check convergence.

$$\epsilon_i = \frac{\sum_{i-4}^{i} Obj_i - \sum_{i-5}^{i-9} Obj_i}{\sum_{i-4}^{i} Obj_i} \quad (7)$$

In Equation 7, i refers to the i-th iteration and $\epsilon_i$ refers to an error value. Additionally, if $\epsilon_i$ is smaller than a predefined threshold (e.g., $\epsilon_{opt}$), the image reprojection system 106 determines that the final objective function converges. Otherwise, the image reprojection system 106 continues to optimize the rescaled depth prediction 310. Upon optimization and/or convergence, the image reprojection system 106 may reproject the source image to the target camera coordinates utilizing the optimized warping parameters (e.g., optimized scale, optimized offset, and/or optimized relative camera pose) to generate the reprojected source image 314, as shown in FIG. 8.

In one or more implementations, the image reprojection system 106 performs a step for generating a reprojected source image from the rescaled depth prediction. The above description of FIGS. 3-8, particularly the description of the acts included in FIG. 8, in connection with the depth prediction optimization pipeline 312, provide supporting acts and algorithms for performing a step for generating a reprojected source image from the depth prediction.

As mentioned above, FIGS. 9A-9B provide additional detail regarding generating a composite digital image utilizing one or more depth predictions. In particular as in greater described below, the image editing system 104 generates one or more of an initial composite image 906, one or more refined composite image(s) 920, or a final composite image 930. The image editing system 104 can provide any of the composite images as an output, although the composite images 906, 920, 930 are progressively more accurate.

In various implementations, the image reprojection system 106 generates a reprojected source image 314 from the target image 302 and the source image 304 utilizing the image reprojection model 300, as described above. In one or more implementations, the reprojected source image 314 is based on optimized warping parameters, as also described above. For example, the image reprojection system 106 utilizes the depth prediction optimization pipeline 312 to jointly optimize the relative camera pose, scale factor, and offset variable associated with a monocular depth prediction of the source image 304 before generating the reprojected source image 314.

As shown, in some implementations, the image reprojection system 106 generates an initial composite image 906. For instance, in one or more implementations, the image reprojection system 106 replaces the image hole mask withing the target image 302 with content from or based on the reprojected source image 314 to generate the initial composite image 906. In particular, the image reprojection system 106 fills the hole with pixels from the reprojected source image 314. For example, the image reprojection system 106 utilizes the depth prediction and generated warping parameters, as described above, to select/blend pixels from the reprojected source image 314 to combine with the target image. In this manner, the image reprojection system 106 generates the initial composite image 906 that fills the hole in the target image with content based on corresponding pixels from the reprojected source image 314.

To illustrate, in one or more implementations, the image reprojection system 106 generates the initial composite image 906 using the formulation shown in Equation 8 below.

$$I_{comp} = I_t \odot M + I_{s \to t} \odot (1-M) \qquad (8)$$

In Equation 8, M refers to the image hole mask 908 indicating an area in the target image 302 that includes a hole (e.g., content and/or pixels removed from the target image 302). Accordingly, as shown in Equation 8, the image reprojection system 106 generates the initial composite image 906 (i.e., $I_{comp}$) by combining portions of the target image (i.e., $I_t$) outside of the hole (e.g., pixels having a value of 1 in M) with portions of the reprojected source image 314 inside of the hole (e.g., pixels having a value of 0 in M).

In various implementations, upon generating the reprojected source image 314, the resulting image includes a web of gaps between some of the pixels. To illustrate, FIG. 9B illustrates an enlarged version of the reprojected source image 314. Often, these gaps are the result of reprojecting the source image 304 from sparse data (e.g., a sparse depth map). As also shown in FIG. 9B, the initial composite image 906 also includes a web of gaps in the portion of the initial composite image 906 that was filled in (e.g., the hole) based on the reprojected source image 314.

To fix these gaps, in various implementations, the image reprojection system 106 utilizes a content-aware fill model 910. To illustrate, FIG. 9A includes the content-aware fill model 910, which the image reprojection system 106 utilizes to generate the refined composite image 920 that fills in the missing pixel gaps as well as blends together adjacent pixels. In some implementations, the content-aware fill model 910 is a color-spatial transformation model. In some implementations, the content-aware fill model 910 is another type of image inpainter, interpolation model, or mesh renderer.

Figure 9A:
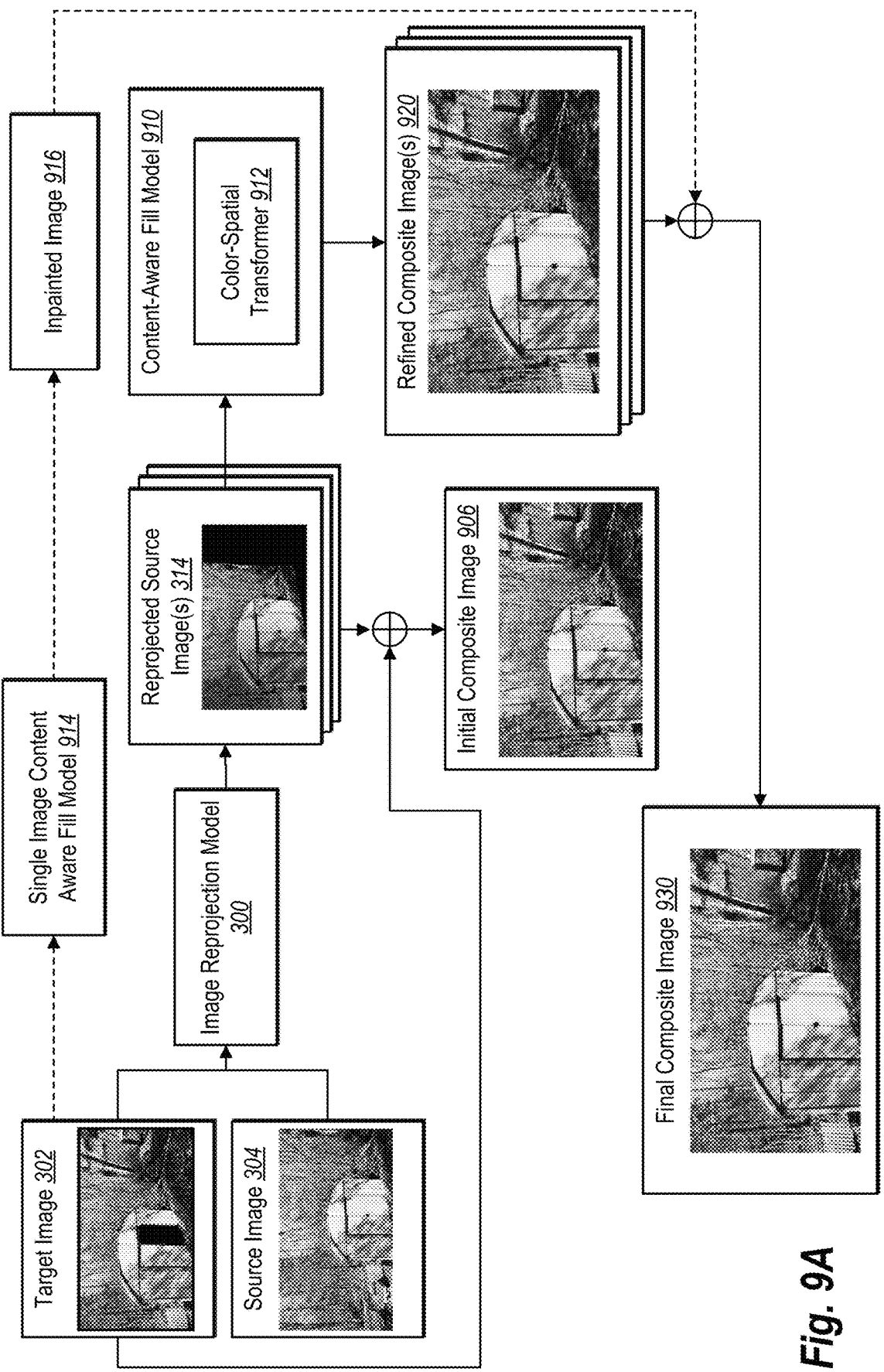

As shown in FIG. 9A, the content-aware fill model 910 includes a color-spatial transformer 912 (CST). For example, the color-spatial transformer 912 includes a color transformer (CT) and a spatial transformer (ST) that refines color matching (e.g., color changes) and spatial alignments (e.g., misalignments) between the reprojected content within the hole and adjacent content outside of the hole in the target image 302. For instance, in some implementations, the content-aware fill model 910 blends together color transformations that occur due to lighting changes between the target image 302 and the source image 304.

In example implementations, the image reprojection system 106 utilizes the color-spatial module and/or other components described in *TransFill: Reference-guided Image Inpainting by Merging Multiple Color and Spatial Transformations*, by Y. Zhou et al., found at arXiv arXiv: 2103.15982, 2021 (hereafter "TransFill"), the entire contents of which are hereby incorporated by reference in their entirety.

More particularly, FIG. 9A illustrates a multi-depth prediction pipeline that combines with deep warping, color harmonization, and optionally single image inpainting. In particular, the image reprojection system 106 generates one or more reprojected images 314 (also referred to herein as proposals). Each reprojected image 314 is based on a different depth prediction. For example, the image reprojection system 106 generates a first reprojected source image 314 utilizing a monocular depth prediction 308. The image reprojection system 106 generates a second reprojected source image 314 is generated utilizing a rescaled depth prediction 310. Optionally, the image reprojection system 106 generates a third reprojected source image 314 based on an optimized rescaled depth prediction.

For each reprojected image or proposal, the image editing system 104 utilizes a color and spatial transformer to simultaneously perform color matching and make a per-pixel spatial transformation to address any residual differences in the reprojected image 314 to generate one or more refined composite images 920. The image editing system 104 then combines the refined composite images (when more than one are generated) to generate a final composite image. In particular, the image editing system 104 selectively blends all of the proposals to generate a final composite image 930.

Optionally, in one or more implementations, the image editing system 104 generates an inpainted image 916 utilizing a single image content-aware fill model 914. An example, the image editing system 104 utilizes, for the single image content-aware fill model 914, the content-aware fill model described by Zeng et al. in *High-Resolution Image Inpainting With Iterative Confidence Feedback And Guided Upsampling*, arXiv preprint arXiv:2005.11742, 2020, the entire contents of which are hereby incorporated by reference. Alternatively, the image editing system 104 utilizes, for the single image content-aware fill model 914, the content-aware fill model described by Barnes et al. in *Patchmatch: A Randomized Correspondence Algorithm for Structural Image Editing*, ACM Trans. Graph. 28(3):24 (2009), which is incorporated herein by reference in its entirety.

As shown, the image editing system 104 optionally fuses the inpainted image 916 with the refined composite image(s) 920 to generate the final composite image 930. In still further implementations, the image editing system 104 optionally fuses the initial composite image 906 with the inpainted image 916 and the refined composite image(s) 920 to generate the final composite image 930. As part of fusing the proposals together, the image editing system 104 optionally weights each proposals as described in TransFill.

In some implementations, the image reprojection system 106 retrains the modules using the geometric depth information generated by the image reprojection system 106 (e.g., image reprojection model 300) to optimize the content-aware fill model 910 to the geometric depth information of the image reprojection system 106. In this manner, the image reprojection system 106 trains the content-aware fill model 910 to better align with the more accurate geometric depth information provided by the image reprojection system 106.

As mentioned above, FIG. 10 illustrates qualitative results comparing reprojected images between one or more implementations of the image reprojection system and a state-of-the-art system. As illustrated, FIG. 10 includes target images with holes 1002, source images 1004, reprojections from a single homography system 1006 (e.g., TransFill), and reprojections from the image reprojection system 1008. The results in FIG. 10 represent a subset of images selected from the evaluation of a large image dataset.

Figure 10:
FIG. 10 illustrates qualitative results comparing reprojected images between one or more implementations of the image reprojection system with a state-of-the-art system.

In FIG. 10, the reprojections from the image reprojection system 1008 are generated from an example implementation of the image reprojection system 106 that utilizes OANet and MiDaS, as described above. Further, the reprojections from the image reprojection system 1008 represent initial composite images without additional image color and spatial refinement and blending.

As shown in FIG. 10, the target images with holes 1002 include an image hole mask (e.g., a hole) applied to a target image where the hole is shown in white. For purposes of evaluation, in each case, the hole was randomly generated. FIG. 10 also shows source images 1004, which captures the same scenes at different viewpoints (e.g., camera locations and/or camera angles) from the target images.

Comparing the reprojections, FIG. 10 shows that the reprojections from the single homography system 1006 perform poorly compared to the reprojections from the image reprojection system 1008 inside the hole regions. In particular, the reprojections from the single homography system 1006 fill the hole regions with incorrect content and/or is greatly misaligned, which results in an unnatural connection between content in the hole regions and the adjacent portions of the target images outside of the hole region. In contrast, the reprojections from the image reprojection system 1008 fill the hole regions with content from the source images 1004 that appear more natural and more accurate.

Figure 11:
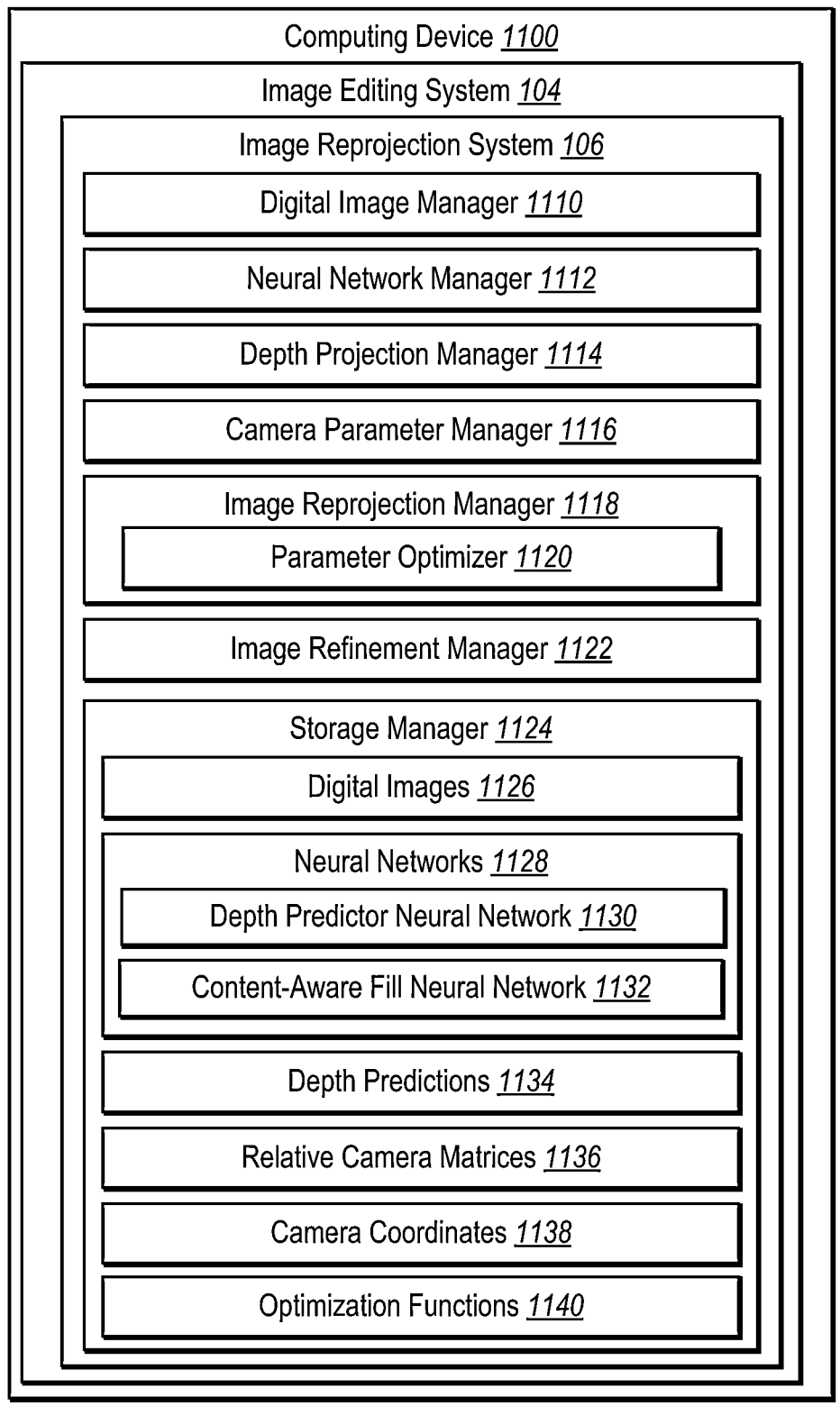
FIG. 11 illustrates a schematic diagram of the image reprojection system on a computing device in accordance with one or more implementations.

Looking now to FIG. 11, additional detail will be provided regarding the components and capabilities of the image reprojection system 106. Specifically, FIG. 11 illustrates an example schematic diagram of the image reprojection system 106 on a computing device 1100 (e.g., one or more of the client device 102 and/or the server device 108). In some implementations, the computing device 1100 refers to a distributed computing system where different managers are located on different devices, as described above.

As shown in FIG. 11, the image reprojection system 106 includes the image editing system 104 and the image reprojection system 106 introduced above. As shown, the image reprojection system 106 in FIG. 11 includes a digital image manager 1110, a neural network manager 1112, a depth prediction manager 1114, a camera parameter manager 1116, an image reprojection manager 1118 having a parameter optimizer 1120, an image refinement manager 1122, and a storage manager 1124. As also shown, the storage manager 1124 includes digital images 1126, neural networks 1128 having a depth prediction neural network 1130 and a content-aware fill model 1132, depth predictions 1134, relative camera matrices 1136, camera coordinates 1138, and optimization functions 1140.

As shown, the image reprojection system 106 includes the digital image manager 1110. In various implementations, the digital image manager 1110 facilitates identifying, accessing, receiving, obtaining, generating, importing, exporting, copying, modifying, removing, providing, and/or organizing digital images 1126. In some implementations, the digital image manager 1110 communicates with the storage manager 1124 to store and retrieve the digital images 1126. Examples of digital images include source images, target images, depth maps, depth predictions, rescaled depth predictions, reprojected images, composite images, initial composite images, refined composite images, and image hole masks.

As shown, the image reprojection system 106 includes the neural network manager 1112. In one or more implementations, the neural network manager 1112 manages, maintains, generates, determines, identifies, extracts, trains, tunes, and/or utilizes one or more machine-learning models and/or neural networks. For instance, as described herein, the neural network manager 1112 utilizes one or more of the neural networks 1128 such as the depth prediction neural network 1130 and/or the content-aware fill model 1132. For example, the neural network manager 1112 facilitates generating a monocular depth prediction (i.e., depth predictions 1134) from a depth prediction neural network 1130. As another example, the neural network manager 1112 facilitates generating the matching correspondence points from an order-aware neural network. As another example, the neural network manager 1112 facilitates generating a refined composite image utilizing a content-aware fill model 1132.

Additionally, the image reprojection system 106 includes the depth prediction manager 1114. In various implementations, the depth prediction manager 1114 manages, determines, generates, modifies, edits, or produces depth predictions 1134. For example, the depth prediction manager 1114 works with the neural network manager 1112 to obtain a monocular depth prediction. In some implementations, the depth prediction manager 1114 determines a rescaled depth prediction from the monocular depth prediction and relative camera matrices 1136, as described above. For example, in some implementations, the depth prediction manager 1114 determines a scale factor and an offset variable that aligns the monocular depth prediction to the same scale as a corresponding relative camera matrix (i.e., relative camera matrices 1136).

FIG. 11 also includes the image reprojection system 106 having the camera parameter manager 1116. In various implementations, the camera parameter manager 1116 manages, determines, generates, modifies, edits, or produces camera parameters, such as relative camera matrices 1136 and/or camera coordinates 1138. For example, in various implementations, the camera parameter manager 1116 determines relative camera matrices 1136 that aligned a camera of a source image to a camera of a target image, as described above.

As shown, the image reprojection system 106 also includes the image reprojection manager 1118. In various implementations, the image reprojection manager 1118 manages, determines, generates, modifies, edits, or produces image reprojected images including reprojected source images (i.e., included in the digital images 1126). In some implementations, the image reprojection manager 1118 determines and/or utilizes the determined scale and offset to generate a reprojected source image based on the rescaled depth prediction (i.e., depth predictions 1134), as described above.

As also shown, the image reprojection manager 1118 includes the parameter optimizer 1120. In various implementations, the parameter optimizer 1120 optimizes one or more warping parameters, which may include depth parameters from the depth predictions 1134 and/or camera parameters from the relative camera matrices 1136 and/or the camera coordinates 1138. In various implementations, the parameter optimizer 1120 utilizes one or more of the optimization functions 1140 described above in connection with the depth prediction optimization pipeline. For example, the image reprojection manager 1118 utilizes one or more of a least squares function, a negative depth penalty function, a multi-scale photometric function, and/or a feature correspondence function, as described above.

Additionally, the image reprojection system 106 includes the image refinement manager 1122. In various implementations, the image refinement manager 1122 manages, determines, generates, modifies, edits, or produces refined composite images (i.e., included in the digital images 1126). In various implementations, the image refinement manager 1122 communicates with the neural network manager 1112 to generate refined composite images utilizing the content-aware fill model 1132 based on depth predictions 1134, as described above.

In one or more implementations, each of the components of the image reprojection system 106 is in communication with one another using any suitable communication technologies. Additionally, the components of the image reprojection system 106 are in communication with one or more other devices including one or more client devices described above. It will be recognized that although the components of the image reprojection system 106 are shown to be separate in FIG. 11, any of the subcomponents may be combined into fewer components, such as into a single component, or divided into more components as may serve a particular implementation. Furthermore, although the components of FIG. 11 are described in connection with the image reprojection system 106, at least some of the components for performing operations in conjunction with the image reprojection system 106 described herein may be implemented on other devices within the environment.

The components of the image reprojection system 106 can include software, hardware, or both. For example, the components of the image reprojection system 106 can include one or more instructions stored on a computer-readable storage medium and executable by processors of one or more computing devices (e.g., the computing device 1100). When executed by one or more processors, the computer-executable instructions of the image reprojection system 106 can cause the computing device 1100 to perform the methods described herein. Alternatively, the components of the image reprojection system 106 can comprise hardware, such as a special purpose processing device to perform a certain function or group of functions. Additionally, or alternatively, the components of the image reprojection system 106 can include a combination of computer-executable instructions and hardware.

Furthermore, the components of the image reprojection system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the image reprojection system 106 may be implemented as part of a stand-alone application on a personal computing device or a mobile device. Alternatively, or additionally, the components of the image reprojection system 106 may be implemented in any application that allows creation and delivery of marketing content to users, including, but not limited to, applications in ADOBE CREATIVE CLOUD, ADOBE PHOTOSHOP, ADOBE LIGHTROOM, ADOBE AFTER EFFECTS. The foregoing are either registered trademarks or trademarks of Adobe Inc. in the United States and/or other countries.

FIGS. 1-11 the corresponding text, and the examples provide a number of different systems, methods, and non-transitory computer-readable media of the image reprojection system 106. In addition to the foregoing, implementations can also be described in terms of flowcharts comprising acts for accomplishing a particular result. For example, FIG. 12 illustrates a flowchart of an example sequence or series of acts in accordance with one or more implementations.

Figure 12:
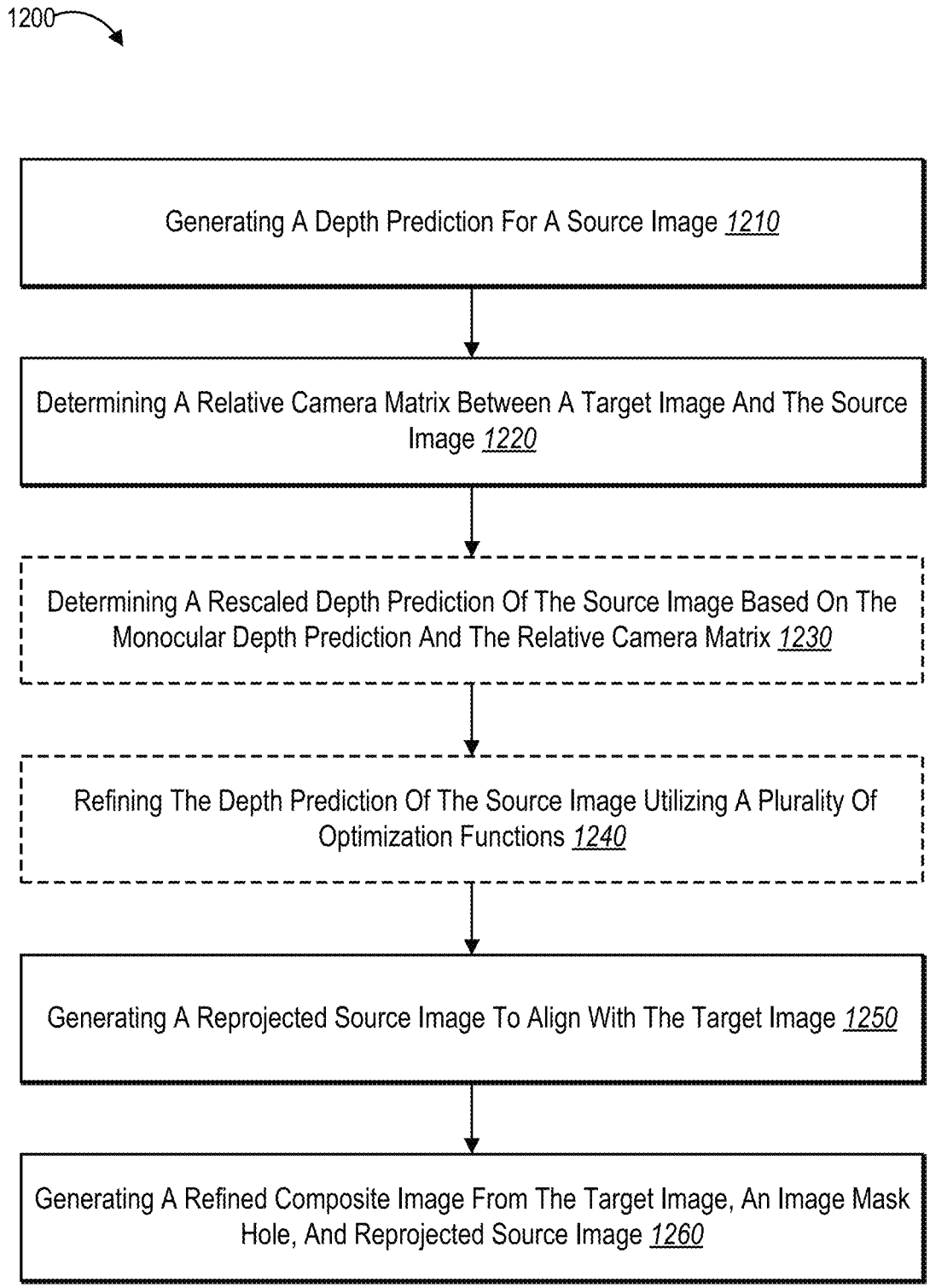
FIG. 12 illustrates a flowchart of a series of acts for generating a reprojected image that includes at least a portion of a source image warped to align with a target image in accordance with one or more implementations.

FIG. 12 illustrates an example series of acts 1200 for generating a reprojected image that includes at least a portion of a source image warped to align with a target image in accordance with one or more implementations. While FIG. 12 illustrates acts according to particular implementations, alternative implementations may omit, add to, reorder, and/or modify any of the acts shown in FIG. 12. The acts of FIG. 12 can be performed as part of a method. Alternatively, a non-transitory computer-readable medium can comprise instructions, that when executed by one or more processors, cause a computing device to perform the acts of FIG. 12. In still further implementations, a system can perform the acts of FIG. 12. Additionally, the acts described herein may be repeated or performed in parallel with one another or in parallel with different instances of the same or other similar acts.

As shown, the series of acts 1200 includes an act 1210 of generating a depth prediction for a source image. For instance, the act 1210 can involve generating a depth prediction utilizing a depth prediction neural network for a source image of an object or a scene. In one or more implementations, the act 1210 includes generating the monocular depth prediction for the source image utilizing a monocular depth estimation neural network. In various implementations, the act 1210 includes generating the monocular depth prediction for the source image utilizing a depth prediction neural network having a point cloud model. In alternative implementations, the act 1210 includes generating the depth prediction for the source image utilizing a neural network as described in *DispSegNet or Learning Accurate Dense Correspondences and When to Trust Them*. In still further implementations, the act 1210 can involves actively generating a depth prediction for a source image when capturing the source image, such as utilizing Lidar or structured light patterns.

In addition, as shown, the series of acts 1200 includes an act 1220 of determining a relative camera matrix between a target image and the source image. For instance, the act 1220 can involve determining a relative camera matrix between a target image of the object or the scene and the source image based on a plurality of matching correspondence points between the source image and the target image, where the source image differs from the target image. In various implementations, the act 1220 includes generating the plurality of matching correspondence points between the source image and the target image utilizing an order-aware neural network. In a number of implementations, the act 1220 includes determining the rescaled depth prediction based on the monocular depth prediction and the relative camera matrix (i.e., relative camera pose). In some implementations, the target image has a hole corresponding to an image hole mask.

As also shown, the series of acts 1200 optionally includes an act 1230 of determining a rescaled depth prediction of the source image based on the monocular depth prediction and the relative camera matrix. In one or more implementations, the act 1230 includes determining an initial scale and an initial offset from the monocular depth. For example, in various implementations, the act 1240 includes determining the initial scale and the initial offset by generating a three-dimensional structure of the plurality of matching correspondence points based on a triangulation of both the relative camera matrix and the plurality of matching correspondence points, generating a sparse depth map based on projecting the three-dimensional structure of the plurality of matching correspondence points to a plurality of source camera coordinates corresponding to the source image, and determining the initial scale and the initial offset by solving a linear regression function on the sparse depth map.

Further, as shown, the series of acts 1200 optionally includes an act 1240 of refining the depth prediction of the source image utilizing a plurality of optimization functions. For instance, the act 1240 can involve refining the depth prediction based on generating a refined scale and a refined offset (e.g., and the other warping parameters such as camera rotation and camera translation) utilizing a plurality of optimization functions. In some implementations, the act 1240 includes generating the refined scale and the refined offset utilizing a first optimization function from the plurality of optimization functions that includes a least squares function that improves the initial scale and the initial offset of the rescaled depth prediction based on the three-dimensional structure of the plurality of matching correspondence points.

In one or more implementations, the act 1240 includes generating the refined scale and the refined offset utilizing a second optimization function from the plurality of optimization functions that includes a negative depth penalty function that penalizes negative depth points positioned behind the plurality of source camera coordinates after rescaling. In various implementations, the act 1240 includes generating the refined scale and the refined offset utilizing a third optimization function from the plurality of optimization functions that includes a multi-scale photometric function that measures color differences between a warped area in the reprojected image and a corresponding adjacent area of the target image. In example implementations, the act 1240 also includes generating the refined scale and the refined offset utilizing a fourth optimization function from the plurality of optimization functions that includes a feature correspondence function that measures distances between reprojected matching feature points in the source image and the target image.

As noted above, in one or more implementations, the act 1240 includes generating refined parameters of the depth prediction and the relative camera matrix based on a plurality of optimization functions. In example implementations, the parameters of the depth prediction includes the initial scale and the initial offset. In certain implementations, the parameters of the relative camera matrix include a rotation and a translation. In some implementations, the act 1240 includes jointly optimizing the refined parameters of the depth prediction and the relative camera matrix utilizing the plurality of optimization functions comprising a least squares function, a negative depth penalty function, a multi-scale photometric function, and a feature correspondence function.

In addition, as shown, the series of acts 1200 includes an act 1250 of generating a reprojected source image to align with the target image. For instance, the act 1250 can involve generating a reprojected image including at least a portion of the source image warped by the refined depth prediction to align with the target image. In one or more implementations, the act 1250 includes generating a reprojected image of the source image that models the scene geometry of the target image by warping the source image by the depth prediction.

As also shown, the series of acts 1200 includes an act 1260 of generating a refined composite image from the target image, an image mask hole, and reprojected source image. For instance, the act 1260 can involve generating a refined composite image from the reprojected image utilizing a content-aware fill model where the refined composite image includes the target image with the hole filled in based on the reprojected image of the source image. In one or more implementations, the act 1260 includes generating a refined composite image from the reprojected image utilizing a content-aware fill model such as a color-spatial transformation model. For example, the act 1260 includes refining the refined composite image from the reprojected image utilizing the color-spatial transformation model based on the depth prediction and/or the rescaled depth prediction.

The series of acts 1200 can include additional acts in various implementations. For instance, in one or more implementations, the series of acts 1200 includes acts of receiving, from a client device, an image mask indicating an area in a target image to be replaced utilizing a content-aware fill model based on a source image; generating a monocular depth prediction of the source image utilizing a depth prediction neural network; generating a refined rescaled depth prediction from the monocular depth prediction of the source image; and generating a reprojected image by replacing the area in the target image with at least a portion of the source image warped to align with the target image based on the rescaled depth prediction. In some implementations, the series of acts 1200 includes an act of generating a refined composite image from the reprojected image utilizing a color-spatial transformation model, the refined composite image including the target image with a hole filled in based on the reprojected image of the source image. In various implementations, the series of acts 1200 includes an act of refining parameters of the rescaled depth prediction including a scale, an offset, and a relative camera matrix (e.g., warping parameters) utilizing three or more optimization functions.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A network is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some implementations, computer-executable instructions are executed on a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, cloud computing is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service (SaaS), Platform as a Service (PaaS), and Infrastructure as a Service (IaaS). A cloud-computing model can also be deployed using different deployment models such as private cloud, community cloud, public cloud, hybrid cloud, and so forth. In this description and in the claims, a cloud-computing environment is an environment in which cloud computing is employed.

Figure 13:
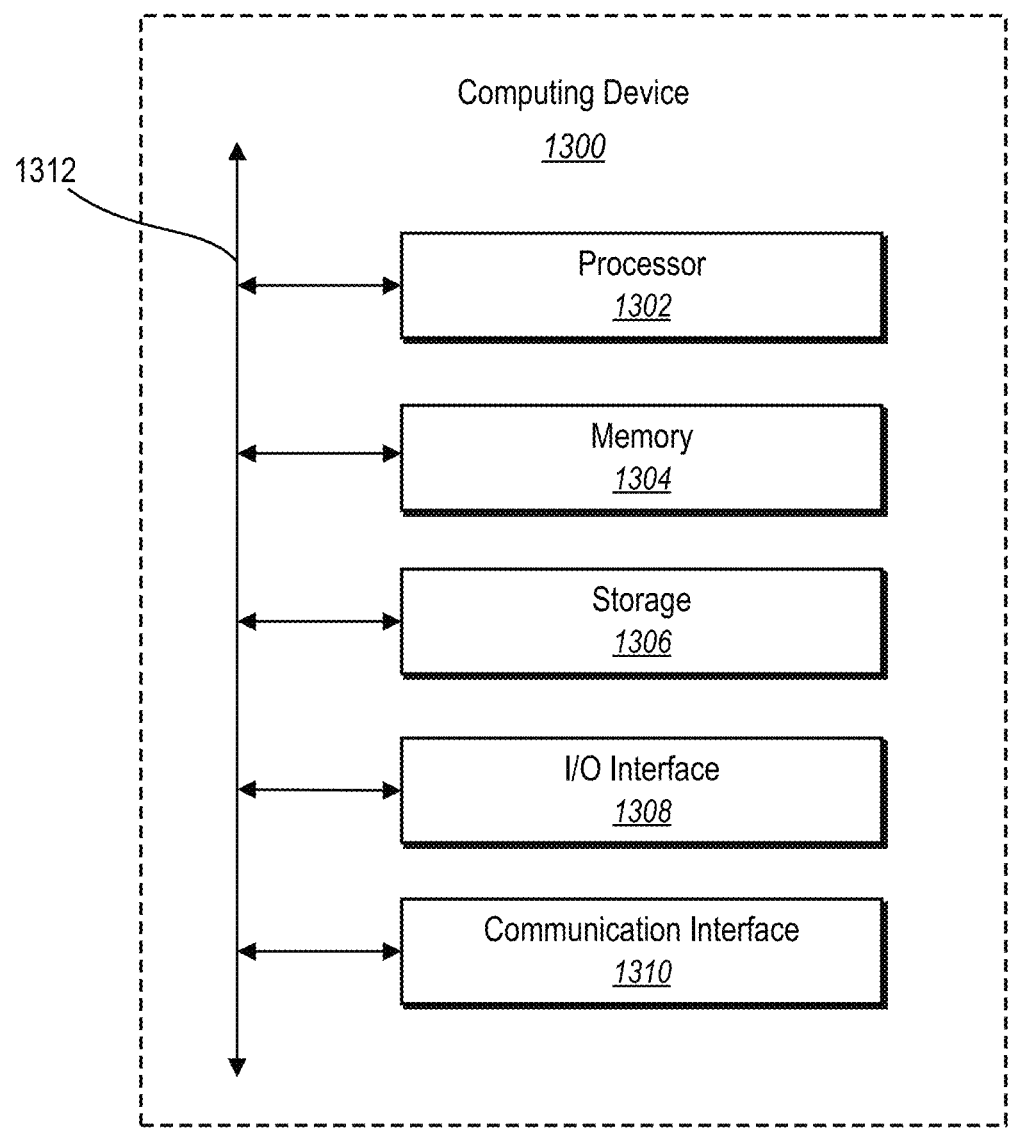
FIG. 13 illustrates a block diagram of an example computing device in accordance with one or more implementations.

FIG. 13 illustrates, in block diagram form, an example computing device 1300 (e.g., the computing device 1100, the client device 102, and/or the server device 108) that may be configured to perform one or more of the processes described above. One will appreciate that the image reprojection system 106 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain implementations, the computing device 1300 can include fewer or more components than those shown in FIG. 13. Components of computing device 1300 shown in FIG. 13 will now be described in additional detail.

In particular implementations, the processor 1302 includes hardware for executing instructions, such as those making up a computer program. As an example, and not by way of limitation, to execute instructions, the processor 1302 may retrieve (or fetch) the instructions from an internal register, an internal cache, memory 1304, or a storage device 1306 and decode and execute them.

The computing device 1300 includes memory 1304, which is coupled to the processor 1302. The memory 1304 may be used for storing data, metadata, and programs for execution by the processor(s). The memory 1304 may include one or more volatile and non-volatile memories, such as Random-Access Memory (RAM), Read-Only Memory (ROM), a solid-state disk (SSD), Flash, Phase Change Memory (PCM), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive, or a combination of these or other storage devices.

The computing device 1300 also includes one or more input or output (I/O) interfaces (or devices), shown as I/O interface 1308, which are provided to allow a user to provide input to (such as user strokes), receive output from, and otherwise transfer data to and from the computing device 1300. These I/O interface 1308 may include a mouse, keypad or a keyboard, a touch screen, camera, optical scanner, network interface, modem, other known I/O devices, or a combination of such I/O interface 1308. The touch screen may be activated with a writing device or a finger.

The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (e.g., packet-based communication) between the computing device 1300 and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to:
   generate, utilizing a trained depth prediction network, a monocular depth prediction for a source image of an object or a scene;
   determine a relative camera matrix between a target image of the object or the scene and the source image based on a plurality of matching correspondence points between the source image and the target image, wherein the source image differs from the target image;
   determine a rescaled depth prediction based on the monocular depth prediction and the relative camera matrix; and
   generate a reprojected image comprising at least a portion of the source image warped based on the rescaled depth prediction and the relative camera matrix to align with the target image.

2. The non-transitory computer-readable medium of claim 1, further comprising instructions that, when executed by the at least one processor, cause the computing device to:
   warp the rescaled depth prediction to align with the target image utilizing the rescaled depth prediction.

3. The non-transitory computer-readable medium of claim 2, further comprising instructions that, when executed by the at least one processor, cause the computing device to determine an initial scale and an initial offset from the monocular depth prediction by:
   generating a three-dimensional structure of the plurality of matching correspondence points based on a triangulation of both the relative camera matrix and the plurality of matching correspondence points;
   generating a sparse depth map based on projecting the three-dimensional structure of the plurality of matching correspondence points to a plurality of source camera coordinates corresponding to the source image; and
   determining the initial scale and the initial offset by solving a linear regression function on the sparse depth map.

4. The non-transitory computer-readable medium of claim 3, further comprising instructions that, when executed by the at least one processor, cause the computing device to refine the monocular depth prediction based on generating a refined scale and a refined offset utilizing a plurality of optimization functions; and
   wherein generating the reprojected image is based on warping at least the portion of the source image by a refined depth prediction to align with the target image.

5. The non-transitory computer-readable medium of claim 4, further comprising instructions that, when executed by the at least one processor, cause the computing device to generate the refined scale and the refined offset utilizing a first optimization function from the plurality of optimization functions that comprises a least squares function that improves the initial scale and the initial offset of the monocular depth prediction based on the three-dimensional structure of the plurality of matching correspondence points.

6. The non-transitory computer-readable medium of claim 4, further comprising instructions that, when executed by the at least one processor, cause the computing device to generate the refined scale and the refined offset utilizing a second optimization function from the plurality of optimization functions that comprises a negative depth penalty function that penalizes negative depth points positioned behind the plurality of source camera coordinates after rescaling.

7. The non-transitory computer-readable medium of claim 5, further comprising instructions that, when executed by the at least one processor, cause the computing device to generate the refined scale and the refined offset utilizing a third optimization function from the plurality of optimization functions that comprises a multi-scale photometric function that measures color differences between a warped area in the reprojected image and a corresponding adjacent area of the target image.

8. The non-transitory computer-readable medium of claim 6, further comprising instructions that, when executed by the at least one processor, cause the computing device to generate the refined scale and the refined offset utilizing a fourth optimization function from the plurality of optimization functions that comprises a feature correspondence function that measures distances between reprojected matching feature points in the source image and the target image.

9. The non-transitory computer-readable medium of claim 1, further comprising instructions that, when executed by the at least one processor, cause the computing device to generate a refined composite image from the reprojected image utilizing a content-aware fill model.

10. The non-transitory computer-readable medium of claim 1, further comprising instructions that, when executed by the at least one processor, cause the computing device to generate the monocular depth prediction for the source image actively when capturing the source image or passively after capture of the source image.

11. A system comprising:
one or more memory devices comprising:
a source image and a target image having a hole corresponding to an image hole mask;
a monocular depth prediction for the source image; and
a relative camera matrix between the source image and the target image; and
one or more processors that are configured to cause the system to:
determine a rescaled depth prediction based on the monocular depth prediction and the relative camera matrix;
generate a reprojected image of the source image that models scene geometry of the target image by warping at least a portion of the source image corresponding to the hole of the target image based on the relative camera matrix and the rescaled depth prediction; and
generate a refined composite image from the reprojected image utilizing a color-spatial transformation model, the refined composite image comprising the target image with the hole filled in based on the reprojected image of the source image.

12. The system of claim 11, wherein the one or more processors that are further configured to cause the system to generate the monocular depth prediction for the source image utilizing a depth prediction neural network having a point cloud model.

13. The system of claim 11, wherein the one or more processors that are further configured to cause the system to determine an initial scale and an initial offset from the monocular depth prediction.

14. The system of claim 13, wherein the one or more processors that are further configured to cause the system to generate refined parameters of the monocular depth prediction and the relative camera matrix based on a plurality of optimization functions, wherein parameters of the monocular depth prediction comprises the initial scale and the initial offset, and wherein parameters of the relative camera matrix comprise a rotation and a translation.

15. The system of claim 14, wherein the one or more processors that are further configured to cause the system to refine the monocular depth prediction based on the refined parameters of the monocular depth prediction and the relative camera matrix.

16. The system of claim 14, wherein the one or more processors that are further configured to cause the system to refine the monocular depth prediction based on jointly optimizing the refined parameters of the monocular depth prediction and the relative camera matrix utilizing the plurality of optimization functions comprising a least squares function, a negative depth penalty function, a multi-scale photometric function, and a feature correspondence function.

17. The system of claim 11, wherein the one or more processors that are further configured to cause the system to generate a final composite image by fusing the refined composite image with one or more proposals generated utilizing the rescaled depth prediction or a single image content-aware fill algorithm.

18. A computer-implemented method comprising:
generating, utilizing a trained depth prediction network, a monocular depth prediction for a source image of an object or a scene;
determining a relative camera matrix between a target image of the object or the scene and the source image based on a plurality of matching correspondence points between the source image and the target image, wherein the source image differs from the target image;
determining a rescaled depth prediction based on the monocular depth prediction and the relative camera matrix; and
generating a reprojected image comprising at least a portion of the source image warped based on the rescaled depth prediction and the relative camera matrix to align with the target image.

19. The computer-implemented method of claim 18, further comprising generating a refined image from the reprojected image utilizing a color-spatial transformation model.

20. The computer-implemented method of claim 18, further comprising refining parameters of the rescaled depth prediction comprising a scale, an offset, and the relative camera matrix utilizing three or more optimization functions.

* * * * *